US012693124B2

(12) United States Patent
Nimura et al.

(10) Patent No.: US 12,693,124 B2
(45) Date of Patent: Jul. 28, 2026

(54) ROUTE SEARCH DEVICE AND COMPUTER PROGRAM

(71) Applicant: AISIN CORPORATION, Kariya (JP)

(72) Inventors: Mitsuhiro Nimura, Kariya (JP); Hidenori Nagasaka, Kariya (JP); Keita Ogawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 99 days.

(21) Appl. No.: 18/274,301

(22) PCT Filed: Feb. 24, 2022

(86) PCT No.: PCT/JP2022/007529
§ 371 (c)(1),
(2) Date: Jul. 26, 2023

(87) PCT Pub. No.: WO2022/181669
PCT Pub. Date: Sep. 1, 2022

(65) Prior Publication Data
US 2024/0068820 A1 Feb. 29, 2024

(30) Foreign Application Priority Data

Feb. 26, 2021 (JP) ................................. 2021-029658

(51) Int. Cl.
*G01C 21/34* (2006.01)
*G01C 21/36* (2006.01)
(52) U.S. Cl.
CPC ..... *G01C 21/3423* (2013.01); *G01C 21/3685* (2013.01)
(58) Field of Classification Search
CPC ........................ G01C 21/3423; G01C 21/3685
See application file for complete search history.

(56) References Cited

U.S. PATENT DOCUMENTS

2009/0187340 A1 7/2009 Vavrus et al.
2009/0198443 A1 8/2009 Yamazaki
(Continued)

FOREIGN PATENT DOCUMENTS

JP 2003-240591 A 8/2003
JP 2009-186205 A 8/2009
(Continued)

OTHER PUBLICATIONS

Communication dated Jul. 12, 2024 issued by the European Patent Office in application No. 22759704.4.

(Continued)

*Primary Examiner* — Adnan M Mirza
(74) *Attorney, Agent, or Firm* — Sughrue Mion, PLLC

(57) ABSTRACT

There are provided a route search device and a computer program that can search for a recommended route for a user to move to a destination from a parking location after the user parks a vehicle in a parking lot. Specifically, a parking lot network is obtained which is a network representing a route that can be selected in a parking lot by the user with moving means used after getting out of the vehicle; an in-building network is obtained which is a network representing a route that can be selected in a building by the user with the moving means used after getting out of the vehicle; and a recommended route from a parking location where the vehicle is parked in the parking lot to a destination present in the building is searched using a network obtained by connecting the parking lot network to the in-building network.

4 Claims, 15 Drawing Sheets

(56)          References Cited

U.S. PATENT DOCUMENTS

2013/0030702 A1     1/2013  Yamamoto
2018/0087922 A1*    3/2018  Wu ..................... G09B 29/106
2019/0063947 A1*    2/2019  Beaurepaire ....... G01C 21/3423
2019/0283736 A1     9/2019  Watanabe
2020/0018602 A1     1/2020  Beaurepaire et al.

FOREIGN PATENT DOCUMENTS

JP              5420079  B2     2/2014
JP          2019-160086  A     9/2019

OTHER PUBLICATIONS

International Search Report of PCT/JP2022/007529 dated May 10, 2022 [PCT/ISA/210].

* cited by examiner

FIG. 4

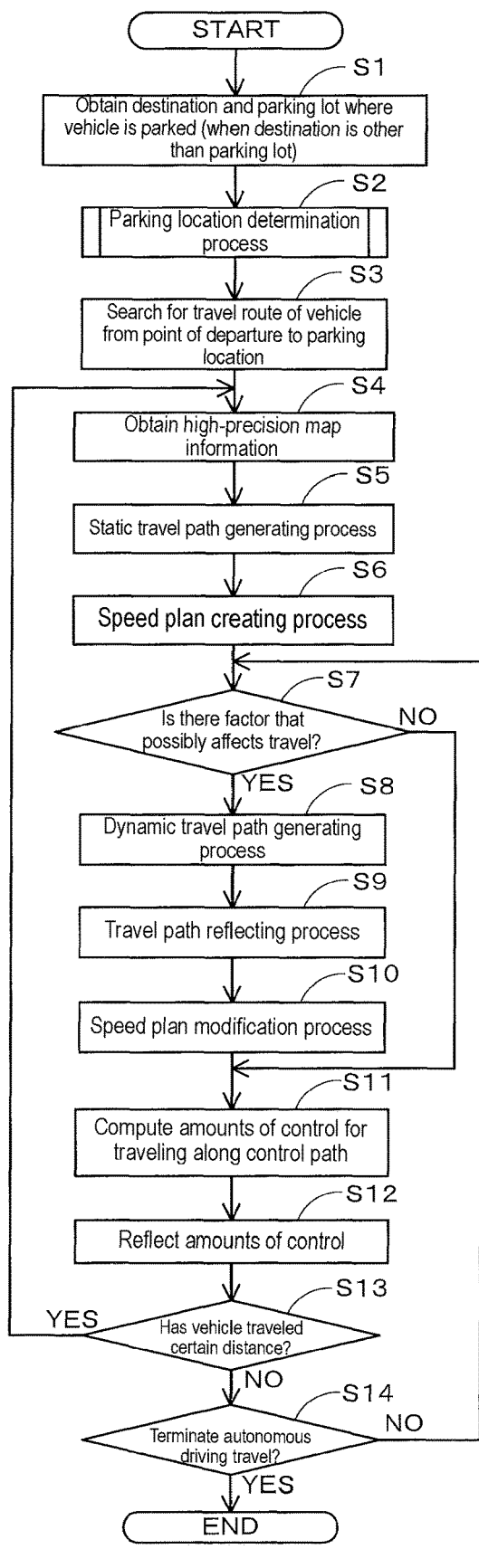

START

S1
Obtain destination and parking lot where vehicle is parked (when destination is other than parking lot)

S2
Parking location determination process

S3
Search for travel route of vehicle from point of departure to parking location S4
Obtain high-precision map information S5
Static travel path generating process S6
Speed plan creating process S7
Is there factor that possibly affects travel? — NO

YES

S8
Dynamic travel path generating process

S9
Travel path reflecting process

S10
Speed plan modification process

S11
Compute amounts of control for traveling along control path

S12
Reflect amounts of control

S13
Has vehicle traveled certain distance? — YES

NO

S14
Terminate autonomous driving travel? — NO

YES

END

FIG. 10

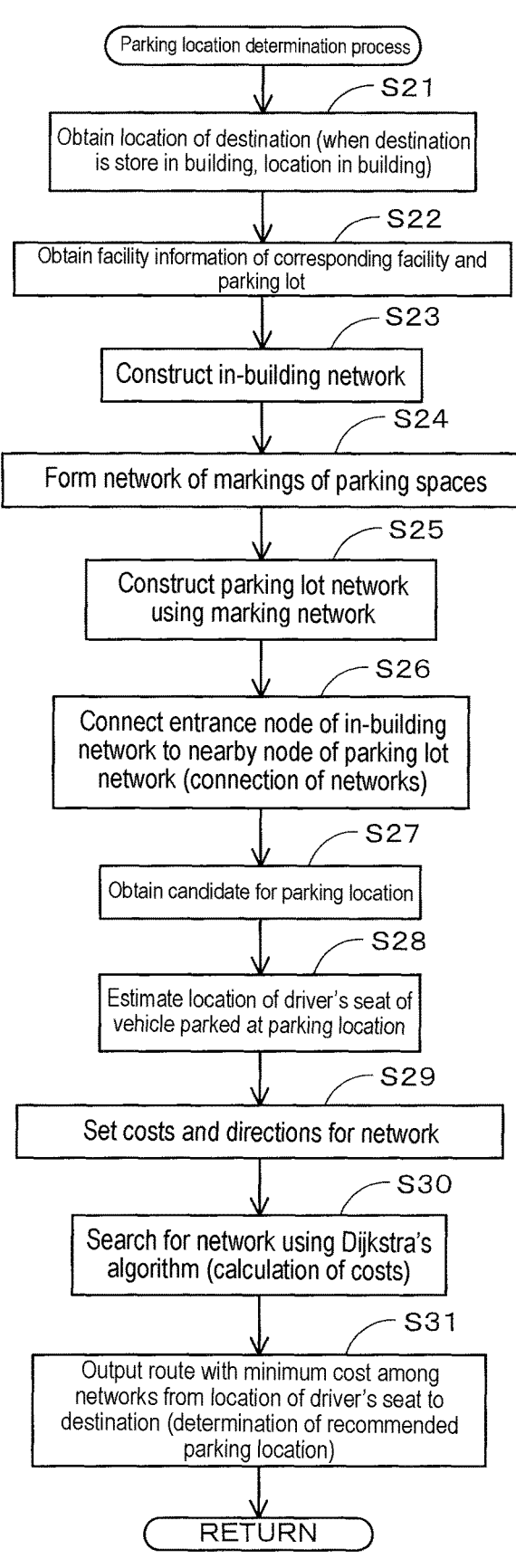

Parking location determination process

S21
Obtain location of destination (when destination is store in building, location in building)

S22
Obtain facility information of corresponding facility and parking lot

S23
Construct in-building network

S24
Form network of markings of parking spaces

S25
Construct parking lot network using marking network

S26
Connect entrance node of in-building network to nearby node of parking lot network (connection of networks)

S27
Obtain candidate for parking location

S28
Estimate location of driver's seat of vehicle parked at parking location

S29
Set costs and directions for network

S30
Search for network using Dijkstra's algorithm (calculation of costs)

S31
Output route with minimum cost among networks from location of driver's seat to destination (determination of recommended parking location)

RETURN

ROUTE SEARCH DEVICE AND COMPUTER PROGRAM

CROSS REFERENCE TO RELATED APPLICATIONS

This application is a National Stage of International Application No. PCT/JP2022/007529, filed Feb. 24, 2022, claiming priority to Japanese Patent Application No. 2021-029658, filed Feb. 26, 2021, the entire contents of which are incorporated in their entirety.

TECHNICAL FIELD

The present disclosure relates to a route search device and a computer program that search for a route from a parking location of a vehicle to a destination.

BACKGROUND ART

When a vehicle moves to a destination, generally, the vehicle moves to a parking lot belonging to the destination or a parking lot around the destination and is parked, and a user moves on foot, etc., to a point which is the destination from a parking location where the vehicle is parked in the parking lot, by which the movement is completed. Particularly, when there are a plurality of candidates for a location where the vehicle is parked, a user's burden on movement after parking greatly varies depending on which location the vehicle is parked at. To provide appropriate assistance by grasping also such a user's burden after parking, it is important to search for a recommended route for the user to move from a parking location to a point which is the destination after getting out of the vehicle. For example, JP 5420079 B2 discloses a technique for searching for a route with the shortest moving distance from an entrance to a parking lot to a store which is a destination, using map data and a store floor plan, and identifying the searched route as an optimal route used when a user moves.

CITATIONS LIST

Patent Literature

Patent Literature 1: JP 5420079 B2 (paragraphs 0037-0043 and FIG. 16)

SUMMARY OF THE DISCLOSURE

Technical Problems

Here, in the above-described Patent Literature 1, when a movement route to a store which is a destination is searched, first, an entrance to a building suitable for movement to the store which is the destination is identified using a floor plan. Then, an entrance to a parking lot that allows access to the identified entrance to the building is identified using map data. Furthermore, a route with the shortest moving distance from the identified entrance to the parking lot to the store which is the destination via a parking location where parking can be performed is identified as an optimal route.

However, the floor plan represents, in the first place, a structure of a building, facilities in the building, a layout of stores in the building, etc., and is not data for showing a route for the user to move. Thus, it has been difficult to identify, based on the floor plan, a route on which the user can move in the building. On the other hand, the map data includes data for showing a route on which the vehicle passes, such as nodes and links, but does not include data for showing a route for the user to move in a parking lot after getting out of the vehicle. Thus, it has been difficult to identify, based on the map data, a route on which the user can move in the parking lot after getting out of the vehicle. Namely, even if the floor plan and the map data are used as in the above-described Patent Literature 1, in practice, there is a possibility that a route on which the user cannot pass or a route that is difficult for the user to pass on may be searched, and there has been a problem that a recommended route for the user to move from a parking location to a point which is a destination cannot be searched.

The aspects of the present disclosure were made to solve the above-described conventional problems, and to provide a route search device and a computer program that can search for a recommended route for a user to move to a destination from a parking location after the user parks a vehicle in a parking lot.

Solutions to Problems

To provide the above-described route search device and computer program, a route search device according to the present invention includes: parking lot network obtaining means for obtaining a parking lot network, the parking lot network being a network representing a route that can be selected in a parking lot by a user with moving means used after getting out of a vehicle; in-building network obtaining means for obtaining an in-building network, the in-building network being a network representing a route that can be selected in a building by a user with moving means used after getting out of a vehicle; and route searching means for searching for a recommended route from a parking location where a vehicle is parked in a parking lot to a destination present in the building, using a network obtained by connecting the parking lot network to the in-building network.

Note that the "moving means used after getting out of a vehicle" corresponds, for example, to walking or a wheelchair.

In addition, a computer program according to the present invention is a program for searching for a route from a parking location of a vehicle to a destination. Specifically, the computer program causes a computer to function as: parking lot network obtaining means for obtaining a parking lot network, the parking lot network being a network representing a route that can be selected in a parking lot by a user with moving means used after getting out of a vehicle; in-building network obtaining means for obtaining an in-building network, the in-building network being a network representing a route that can be selected in a building by a user with moving means used after getting out of a vehicle; and route searching means for searching for a recommended route from a parking location where a vehicle is parked in a parking lot to a destination present in the building, using a network obtained by connecting the parking lot network to the in-building network.

Advantageous Effects of Various Aspects of the Disclosure

According to the route search device and computer program according to the present disclosure that have the above-described configurations, using a network obtained by connecting a parking lot network which is a network representing a route that can be selected in a parking lot by the user with moving means used after getting out of the vehicle to an in-building network which is a network representing a route that can be selected in a building by the user with the moving means used after getting out of the vehicle, a recommended route for the user to move to a destination from a parking location after the user parks the vehicle in the parking lot is searched, and thus, it becomes possible to appropriately search for a recommended route for the user to move across both areas, in the parking lot and the building, after getting out of the vehicle, without selecting a route on which the user cannot pass or a route that is difficult for the user to pass on.

BRIEF DESCRIPTION OF DRAWINGS

FIG. 4 is a flowchart of an autonomous driving assistance program according to the present embodiment.

FIG. 10 is a flowchart of a subprocess program of a parking location determination process.

DESCRIPTION OF EMBODIMENTS

Figure 1:
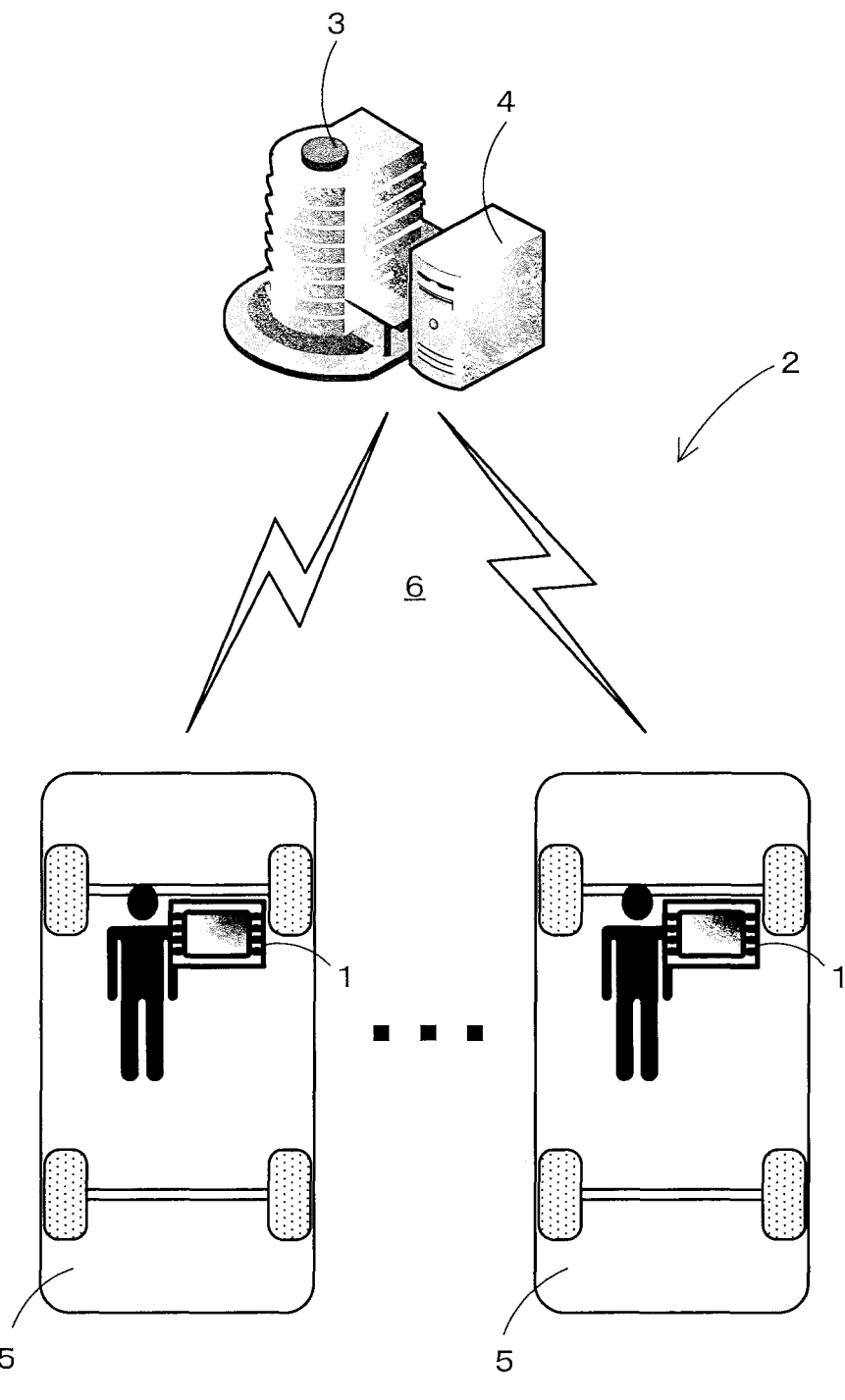
FIG. 1 is a schematic configuration diagram showing a driving assistance system according to the present embodiment.
Figure 2:
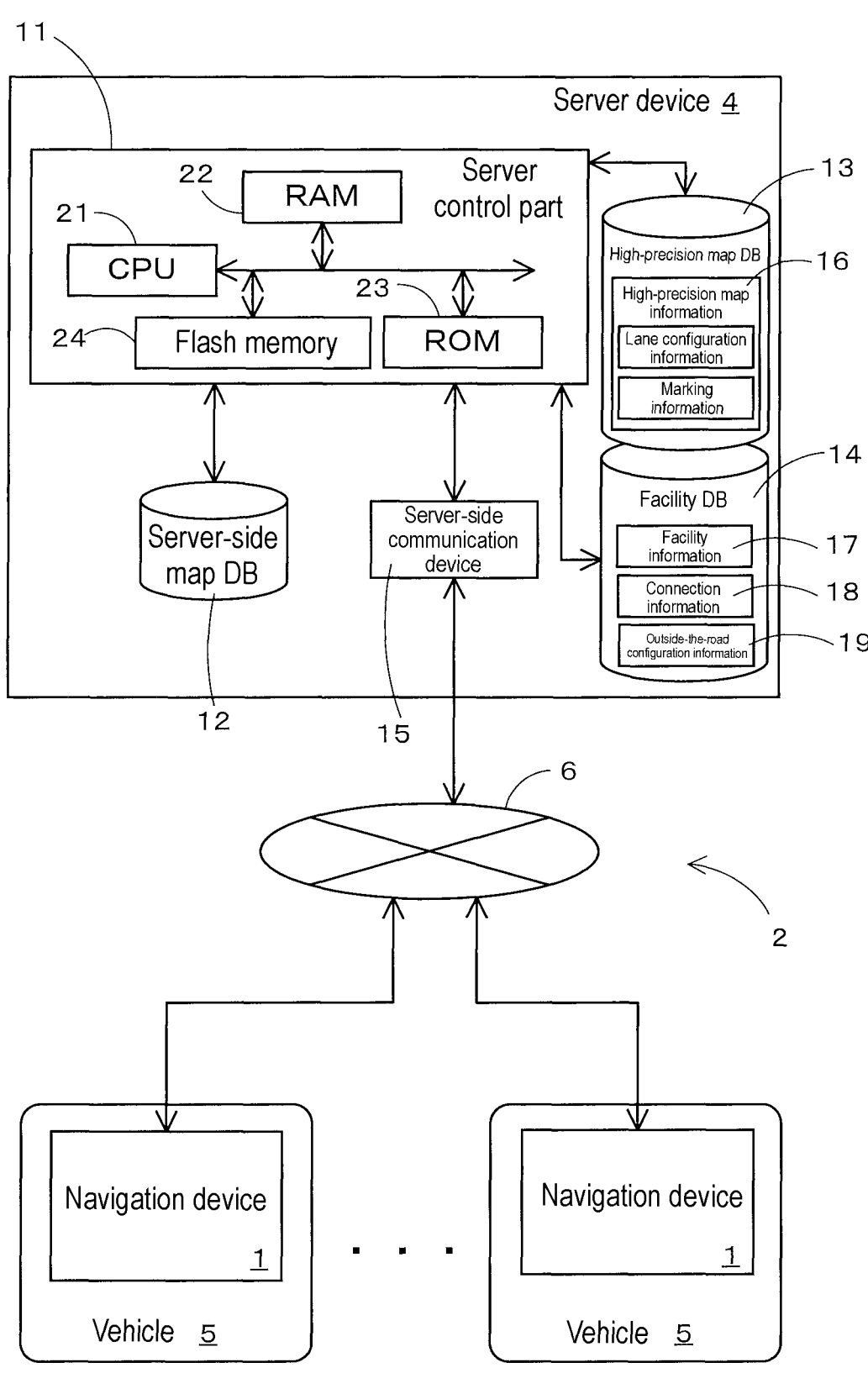
FIG. 2 is a block diagram showing a configuration of the driving assistance system according to the present embodiment.

One embodiment in which a route search device according to the present disclosure is embodied into a navigation device 1 will be described in detail below with reference to the drawings. First, a schematic configuration of a driving assistance system 2 including navigation devices 1 according to the present embodiment will be described using FIGS. 1 and 2. FIG. 1 is a schematic configuration diagram showing the driving assistance system 2 according to the present embodiment. FIG. 2 is a block diagram showing a configuration of the driving assistance system 2 according to the present embodiment.

As shown in FIG. 1, the driving assistance system 2 according to the present embodiment basically includes a server device 4 provided in an information delivery center 3; and navigation devices 1 each mounted on a vehicle 5 to provide various types of assistance related to autonomous driving of the vehicle 5. In addition, the server device 4 and the navigation devices 1 are configured to be able to perform transmission and reception of electronic data with each other through a communication network 6. Note that instead of the navigation device 1, other in-vehicle devices mounted on the vehicle 5 or a vehicle control device that performs control for the vehicle 5 may be used.

Here, the vehicle 5 is a vehicle that can perform assistance travel by autonomous driving assistance in which the vehicle autonomously travels on a preset route or along a road independently of user's driving operations, in addition to manual driving travel in which the vehicle travels based on user's driving operations.

In addition, a configuration may be adopted in which autonomous driving assistance is provided for all road sections or is provided only while the vehicle travels on a specific road section (e.g., an expressway having a gate (it does not matter whether or not there is a person or whether or not a toll is collected) at a boundary). The following description is made assuming that an autonomous driving section in which autonomous driving assistance for the vehicle is provided includes a parking lot in addition to all road sections including general roads and expressways, and that autonomous driving assistance is basically provided during a period from when the vehicle starts traveling until the vehicle finishes traveling (until the vehicle is parked). Note, however, that it is desirable that instead of always providing autonomous driving assistance when the vehicle travels on an autonomous driving section, autonomous driving assistance be provided only in a situation in which provision of autonomous driving assistance is selected by a user (e.g., an autonomous driving start button is turned on) and it is determined that travel by autonomous driving assistance can be performed. On the other hand, the vehicle 5 may be a vehicle that can only perform assistance travel by autonomous driving assistance.

In vehicle control performed by autonomous driving assistance, for example, a current location of the vehicle, a lane in which the vehicle travels, and the location of an obstacle around the vehicle are detected whenever necessary, and as will be described later, vehicle control of steering, a drive source, a brake, etc., is autonomously performed so that the vehicle travels along a travel path generated by the navigation device 1 and at a speed in accordance with a speed plan created likewise. Note that in assistance travel by autonomous driving assistance of the present embodiment, for a lane change, a left or right turn, and a parking operation, too, travel is performed by performing the above-described vehicle control by autonomous driving assistance, but a configuration may be adopted in which special travel such as a lane change, a left or right turn, and a parking operation is performed by manual driving instead of performing travel by autonomous driving assistance.

Meanwhile, the navigation device 1 is an in-vehicle device mounted on the vehicle 5 to display a map of an area around the location of the vehicle 5 based on map data included in the navigation device 1 or map data obtained from an external source, or perform user's input of a destination, or display a current location of the vehicle on a map image, or provide guidance on movement along a set guidance route. In the present embodiment, particularly, when the vehicle performs assistance travel by autonomous driving assistance, various types of assistance information about the autonomous driving assistance are generated. The assistance information includes, for example, a travel path recommended for the vehicle to travel along (including a recommended way of moving into lanes), selection of a parking location where the vehicle is parked at a destination, and a speed plan indicating vehicle speed at which the vehicle travels. Note that details of the navigation device 1 will be described later.

In addition, the server device 4 performs a route search in response to a request from a navigation device 1. Specifically, information required for a route search such as a point of departure and a destination is transmitted together with a route search request from a navigation device 1 to the server device 4 (note, however, that in a case of re-searching, information about a destination does not necessarily need to be transmitted). Then, the server device 4 having received the route search request performs a route search using map information included in the server device 4, to identify a recommended route from the point of departure to the destination. Thereafter, the identified recommended route is transmitted to the navigation device 1 which is a source of the request. The navigation device 1 can provide a user with information about the received recommended route, or can also generate, using the recommended route, various types of assistance information about autonomous driving assistance as will be described later.

Furthermore, the server device 4 includes high-precision map information which is map information with higher precision, separately from normal map information used for the above-described route search; and facility information. The high-precision map information includes, for example, information about the lane configurations of roads (lane-by-lane road configurations, curvatures, lane widths, etc.) and markings (centerlines, lane lines, edge lines, guidelines, etc.) painted on the roads. In addition to the information, information about intersections, etc., are also included. On the other hand, the facility information is more detailed information about facilities that is stored separately from information about facilities included in the map information. The facility information includes, for example, information about a facility floor plan and an entrance to a parking lot, layout information of passages and parking spaces provided in the parking lot, information on makings that mark off the parking spaces, and connection information indicating a connection relationship between the entrance to the parking lot and a lane. The server device 4 delivers high-precision map information and facility information in response to a request from a navigation device 1, and the navigation device 1 generates various types of assistance information about autonomous driving assistance as will be described later, using the high-precision map information and facility information delivered from the server device 4. Note that the high-precision map information is basically map information targeting only a road (link) and an area around the road, but may be map information that also includes an area other than the area around the road.

Note, however, that the above-described route search process does not necessarily need to be performed by the server device 4, and if a navigation device 1 has map information, then the navigation device 1 may perform the route search process. In addition, high-precision map information and facility information may be included in advance in the navigation device 1, instead of being delivered from the server device 4.

In addition, the communication network 6 includes multiple base stations disposed all over the country; and telecommunications companies that manage and control their base stations, and is formed by connecting the base stations to the telecommunications companies by wire (optical fiber, ISDN, etc.) or wirelessly. Here, the base stations each include a transceiver and an antenna that perform communication with navigation devices 1. While the base station performs radio communication with a telecommunications company, the base station serves as an end of the communication network 6 and plays a role in relaying communication of navigation devices 1 present in an area (cell) where radio waves from the base station reach, to the server device 4.

Next, a configuration of the server device 4 in the driving assistance system 2 will be described in more detail using FIG. 2. The server device 4 includes, as shown in FIG. 2, a server control part 11, a server-side map DB 12 connected to the server control part 11 and serving as information recording means, a high-precision map DB 13, a facility DB 14, and a server-side communication device 15.

The server control part 11 is a control unit (an MCU, an MPU, etc.) that performs overall control of the server device 4, and includes a CPU 21 serving as a computing device and a control device; and internal storage devices such as a RAM 22 used as a working memory when the CPU 21 performs various types of arithmetic processing, a ROM 23 having recorded therein a program for control, etc., and a flash memory 24 that stores a program read from the ROM 23. Note that the server control part 11 includes various types of means serving as processing algorithms with an ECU of a navigation device 1 which will be described later.

Meanwhile, the server-side map DB 12 is storage means for storing server-side map information which is the latest version of map information registered based on input data from an external source and input operations. Here, the server-side map information includes a road network and various types of information required for a route search, route guidance, and map display. For example, there are included network data including nodes and links that indicate a road network, link data about roads (links), node data about node points, intersection data about each intersection, point data about points such as facilities, map display data for displaying a map, search data for searching for a route, and retrieval data for retrieving a point.

In addition, the high-precision map DB 13 is storage means for storing high-precision map information 16 which is map information with higher precision than the above-described server-side map information. The high-precision map information 16 is, particularly, map information that stores more detailed information about roads and facilities where vehicles are to travel. In the present embodiment, the high-precision map information 16 includes, for example, for roads, information about lane configurations (lane-by-lane road configurations, curvatures, lane widths, etc.) and markings (centerlines, lane lines, edge lines, guidelines, etc.) painted on the roads. Furthermore, the high-precision map information 16 records data representing road gradients, cants, banks, merge areas, a location where the number of lanes decreases, a location where road width becomes narrower, railroad crossings, etc., and records: for a corner, data representing the radius of curvature, an intersection, a T-junction, the entry and exit of the corner, etc.; for road attributes, data representing downhill slopes, uphill slopes, etc.; and for the types of road, data representing general roads such as national highways, prefectural highways, and narrow streets, and toll roads such as national expressways, urban expressways, automobile roads, general toll roads, and toll bridges. Particularly, in the present embodiment, there is also stored information that identifies, in addition to the number of lanes on a road, a passage segment in a traveling direction for each lane and a connection between roads for each lane (specifically, a correspondence between a lane included in a road before passing through an intersection and a lane included in a road after passing through the intersection). Furthermore, speed limits set for roads are also stored.

Meanwhile, the facility DB 14 is storage means for storing more detailed information about facilities than information about facilities stored in the above-described server-side map information. Specifically, as facility information 17, there are included, particularly, for a parking lot that is where to park vehicles (including both a parking lot belonging to a facility and an independent parking lot), information that identifies the location of an entrance/exit of the parking lot, information that identifies a layout of parking spaces in the parking lot, information about markings that mark off the parking spaces, and information about passages through which vehicles and pedestrians can pass. For a facility other than parking lots, information that identifies a facility floor plan is included. The floor plan includes information that identifies, for example, the locations of entrances and exits, passages, stairs, elevators, and escalators. In addition, for a complex commercial facility having a plurality of tenants, information that identifies the location of each tenant that occupies the complex commercial facility is included. The facility information 17 may be, particularly, information generated by 3D modeling of a parking lot or a facility. Furthermore, the facility DB 14 also includes connection information 18 indicating a connection relationship between a lane included in an entry road facing an entrance to a parking lot and the entrance to the parking lot; and outside-the-road configuration information 19 that identifies a region between the entry road and the entrance to the parking lot, through which vehicles can pass. Details of each piece of information stored in the facility DB 14 will be described later.

Note that the high-precision map information 16 is basically map information targeting only a road (link) and an area around the road, but may be map information that also includes an area other than the area around the road. In addition, although in the example shown in FIG. 2, server-side map information stored in the server-side map DB 12 and information stored in the high-precision map DB 13 and the facility DB 14 are different pieces of map information, the information stored in the high-precision map DB 13 and the facility DB 14 may be a part of the server-side map information. In addition, the high-precision map DB 13 and the facility DB 14 may be a single database instead of being separated from each other.

Meanwhile, the server-side communication device 15 is a communication device for performing communication with the navigation device 1 of each vehicle 5 through the communication network 6. In addition, besides the navigation devices 1, it is also possible to receive traffic information including pieces of information such as traffic congestion information, regulation information, and traffic accident information that are transmitted from an Internet network, traffic information centers, e.g., a VICS (registered trademark: Vehicle Information and Communication System) center, etc.

Figure 3:
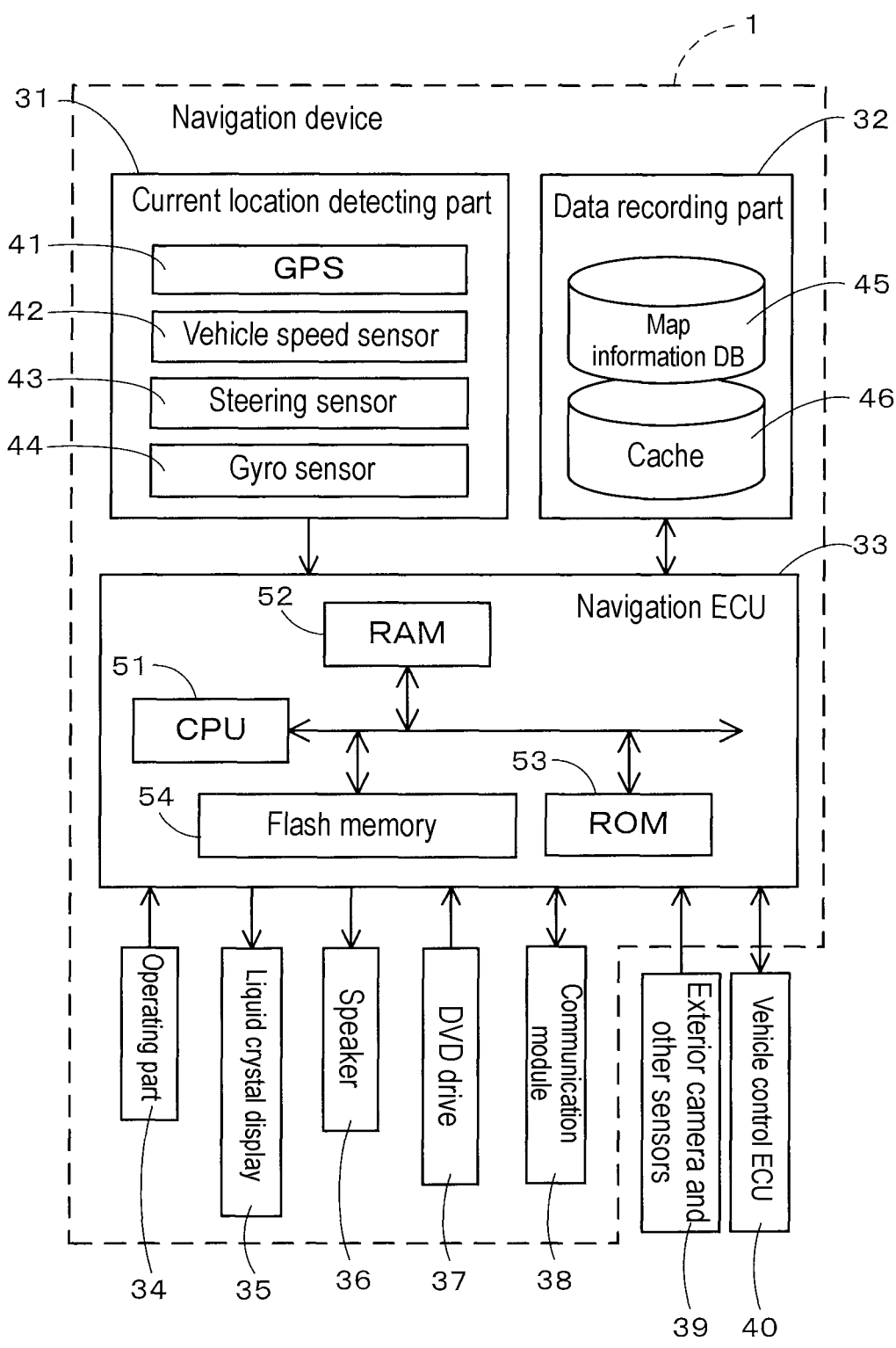
FIG. 3 is a block diagram showing a navigation device according to the present embodiment.

Next, a schematic configuration of the navigation device 1 mounted on the vehicle 5 will be described using FIG. 3. FIG. 3 is a block diagram showing the navigation device 1 according to the present embodiment.

As shown in FIG. 3, the navigation device 1 according to the present embodiment includes a current location detecting part 31 that detects a current location of the vehicle having the navigation device 1 mounted thereon; a data recording part 32 having various types of data recorded therein; a navigation ECU 33 that performs various types of arithmetic processing based on inputted information; an operating part 34 that accepts operations from a user; a liquid crystal display 35 that displays to the user a map of an area around the vehicle, information about a guidance route (a planned travel route of the vehicle) set on the navigation device 1, etc.; a speaker 36 that outputs voice guidance about route guidance; a DVD drive 37 that reads a DVD which is a storage medium; and a communication module 38 that performs communication with information centers such as a probe center and a VICS center. In addition, an exterior camera 39 and various types of sensors that are installed on the vehicle having the navigation device 1 mounted thereon are connected to the navigation device 1 through an in-vehicle network such as a CAN. Furthermore, the navigation device 1 is also connected to a vehicle control ECU 40 that performs various types of control on the vehicle having the navigation device 1 mounted thereon, such that the navigation device 1 and the vehicle control ECU 40 can perform two-way communication.

The components included in the navigation device 1 will be described in turn below.

The current location detecting part 31 includes a GPS 41, a vehicle speed sensor 42, a steering sensor 43, a gyro sensor 44, etc., and can detect the current vehicle location and orientation, a travel speed of the vehicle, a current time, etc. Here, particularly, the vehicle speed sensor 42 is a sensor for detecting the moving distance and vehicle speed of the vehicle, and generates pulses according to the rotation of drive wheels of the vehicle and outputs a pulse signal to the navigation ECU 33. Then, the navigation ECU 33 counts the generated pulses, thereby calculating the rotational speed of the drive wheels and a moving distance. Note that the navigation device 1 does not need to include all of the above-described four types of sensors, and may be configured to include only one or a plurality of types of sensors among these sensors.

In addition, the data recording part 32 includes a hard disk (not shown) serving as an external storage device and a recording medium; and a recording head (not shown) which is a driver for reading a map information DB 45 recorded on the hard disk, a cache 46, a predetermined program, etc., and for writing predetermined data to the hard disk. Note that the data recording part 32 may include a flash memory, a memory card, or an optical disc such as a CD or a DVD, instead of a hard disk. In addition, in the present embodiment, as described above, the server device 4 searches for a route to a destination, and thus, the map information DB 45 may be omitted. Even if the map information DB 45 is omitted, it is also possible to obtain map information from the server device 4 as necessary.

Here, the map information DB 45 is storage means having stored therein, for example, link data about roads (links), node data about node points, search data used in processes related to a route search or change, facility data about facilities, map display data for displaying a map, intersection data about each intersection, and retrieval data for retrieving a point.

Meanwhile, the cache 46 is storage means for saving high-precision map information 16, facility information 17, connection information 18, and outside-the-road configuration information 19 that have been delivered from the server device 4 in the past. A saving period can be set as appropriate, and may be, for example, a predetermined period (e.g., one month) after storage or a period until an ACC power supply (accessory power supply) of the vehicle is turned off. In addition, after the amount of data stored in the cache 46 reaches an upper limit, the data may be sequentially deleted in order of oldest to newest. The navigation ECU 33 generates various types of assistance information about autonomous driving assistance, using the high-precision map information 16, facility information 17, connection information 18, and outside-the-road configuration information 19 stored in the cache 46. Details will be described later.

Meanwhile, the navigation ECU (electronic control unit) 33 is an electronic control unit that performs overall control of the navigation device 1, and includes a CPU 51 serving as a computing device and a control device; and internal storage devices such as a RAM 52 that is used as a working memory when the CPU 51 performs various types of arithmetic processing and that stores route data obtained when a route is searched, etc., a ROM 53 having recorded therein a program for control, an autonomous driving assistance program (see FIG. 4) which will be described later, etc., and a flash memory 54 that stores a program read from the ROM 53. Note that the navigation ECU 33 includes various types of means serving as processing algorithms. For example, parking lot network obtaining means obtains a parking lot network which is a network representing a route that can be selected in a parking lot by the user with moving means which is used after getting out of the vehicle. In-building network obtaining means obtains an in-building network which is a network representing a route that can be selected in a building by the user with the moving means which is used after getting out of the vehicle. Route searching means searches for a recommended route from a parking location where the vehicle is parked in the parking lot to a destination in the building, using a network obtained by connecting the parking lot network to the in-building network.

The operating part 34 is operated, for example, upon inputting a point of departure which is a travel start point and a destination which is a travel end point, and includes a plurality of operating switches such as various types of keys and buttons (not shown). Based on a switch signal outputted by, for example, depression of a given switch, the navigation ECU 33 performs control to perform a corresponding one of various types of operation. Note that the operating part 34 may include a touch panel provided on the front of the liquid crystal display 35. Note also that the operating part 34 may include a microphone and a voice recognition device.

In addition, on the liquid crystal display 35 there are displayed a map image including roads, traffic information, operation guidance, an operation menu, guidance on keys, information on guidance along a guidance route (planned travel route), news, weather forecasts, time, e-mails, TV programs, etc. Note that instead of the liquid crystal display 35, a HUD or an HMD may be used.

In addition, the speaker 36 outputs voice guidance that provides guidance on travel along a guidance route (planned travel route) or guidance on traffic information, based on an instruction from the navigation ECU 33.

In addition, the DVD drive 37 is a drive that can read data recorded on a recording medium such as a DVD or a CD. Based on the read data, for example, music or video is played back or the map information DB 45 is updated. Note that instead of the DVD drive 37, a card slot for performing reading and writing on a memory card may be provided.

In addition, the communication module 38 is a communication device for receiving traffic information, probe information, weather information, etc., that are transmitted from traffic information centers, e.g., a VICS center and a probe center, and corresponds, for example, to a mobile phone or a DCM. In addition, the communication module 38 also includes a vehicle-to-vehicle communication device that performs communication between vehicles and a roadside-device-to-vehicle communication device that performs communication with a roadside device. In addition, the communication module 38 is also used to transmit and receive route information searched by the server device 4, high-precision map information 16, facility information 17, connection information 18, and outside-the-road configuration information 19 to/from the server device 4.

In addition, the exterior camera 39 includes, for example, a camera that uses a solid-state imaging device such as a CCD, and is attached to the upper side of a front bumper of the vehicle and is placed such that an optical-axis direction faces downward at a predetermined angle relative to the horizontal. When the vehicle travels on an autonomous driving section, the exterior camera 39 captures an image of an area ahead in a traveling direction of the vehicle. In addition, the navigation ECU 33 performs image processing on the captured image having been captured, thereby detecting markings painted on a road on which the vehicle travels, and obstacles such as other vehicles around the vehicle, and generates various types of assistance information about autonomous driving assistance, based on results of the detection. For example, when an obstacle has been detected, a new travel path where the vehicle travels avoiding or following the obstacle is generated. Note that the exterior camera 39 may be configured to be disposed on the rear or side of the vehicle other than the front. Note also that for means for detecting obstacles, a sensor such as millimeter-wave radar or a laser sensor, vehicle-to-vehicle communication, or roadside-device-to-vehicle communication may be used instead of a camera.

In addition, the vehicle control ECU 40 is an electronic control unit that controls the vehicle having the navigation device 1 mounted thereon. In addition, driving parts of the vehicle such as steering, a brake, and an accelerator are connected to the vehicle control ECU 40, and in the present embodiment, particularly, after the vehicle starts autonomous driving assistance, each driving part is controlled, by which autonomous driving assistance for the vehicle is provided. In addition, when an override has been performed by the user during autonomous driving assistance, the fact that the override has been performed is detected.

Here, the navigation ECU 33 transmits various types of assistance information about autonomous driving assistance generated by the navigation device 1 to the vehicle control ECU 40 through the CAN after starting traveling. Then, the vehicle control ECU 40 provides autonomous driving assistance to be provided after starting traveling, using the received various types of assistance information. The assistance information includes, for example, a travel path recommended for the vehicle to travel along and a speed plan indicating vehicle speed at which the vehicle travels.

Next, an autonomous driving assistance program executed by the CPU 51 of the navigation device 1 according to the present embodiment that has the above-described configuration will be described based on FIG. 4. FIG. 4 is a flowchart of the autonomous driving assistance program according to the present embodiment. Here, the autonomous driving assistance program is a program that is executed after the ACC power supply (accessory power supply) of the vehicle is turned on and when travel of the vehicle by autonomous driving assistance has started, and that performs assistance travel by autonomous driving assistance in accordance with assistance information generated by the navigation device 1. In addition, programs shown in flowcharts of the following FIGS. 4 and 10 are stored in the RAM 52 or the ROM 53 included in the navigation device 1, and are executed by the CPU 51.

First, in the autonomous driving assistance program, at step (hereinafter, abbreviated as S) 1, the CPU 51 obtains a destination which is a user's movement target. Basically, the destination is set by a user's operation accepted by the navigation device 1. Note that the destination may be a parking lot or may be a point other than a parking lot. Note, however, that when the destination is a point other than a parking lot, a parking lot where the user parks the vehicle at the destination is also obtained. When the destination has a dedicated parking lot or an associated parking lot, the parking lot is a parking lot where the user parks the vehicle. On the other hand, when there is no dedicated parking lot or associated parking lot, a parking lot present around the destination is a parking lot where the user parks the vehicle. Note that when there are a plurality of candidate parking lots, all candidate parking lots may be obtained as a parking lot where the user parks the vehicle, or any one of the parking lots selected by the user may be obtained as a parking lot where the user parks the vehicle.

Then, at S2, the CPU 51 performs a parking location determination process (FIG. 10) which will be described later. Here, the parking location determination process is a process of determining a parking location (parking space) recommended for the user to park the vehicle in the parking lot in which the user parks the vehicle and which is obtained at the above-described S1, by taking into account a movement route on which the user moves to the destination after parking the vehicle in the parking lot. Note, however, that when the destination is a parking lot, instead of performing the parking location determination process at the above-described S2, a parking space that is easy for the user to stop the vehicle (e.g., a parking space near an entrance to the parking lot or a parking space with no other vehicles parked at its left and right) is determined to be a parking location recommended for the user to park the vehicle from among open parking spaces in the parking lot.

Subsequently, at S3, the CPU 51 searches for a recommended travel route of the vehicle from a current location of the vehicle to the parking location recommended for parking which is determined at the above-described S2 (hereinafter, referred to as recommended parking location). In the present embodiment, the search for a travel route at the above-described S3 is performed, particularly, by the server device 4. When a search for a travel route is performed, first, the CPU 51 transmits a route search request to the server device 4. Note that the route search request includes a terminal ID that identifies the navigation device 1 which is a sender of the route search request; and information that identifies a point of departure (e.g., a current location of the vehicle) and the recommended parking location determined at the above-described S2. Thereafter, the CPU 51 receives searched-route information transmitted from the server device 4 in response to the route search request. The searched-route information is information that identifies a recommended travel route from the point of departure to the recommended parking location (e.g., a series of links included in the travel route), the travel route being searched by the server device 4 based on the transmitted route search request and using the latest version of map information. The search is performed using, for example, the publicly known Dijkstra's algorithm.

In addition, when, at the above-described S3, the server device 4 searches for, particularly, a recommended travel route from an entrance to the parking lot to the recommended parking location in the parking lot, the server device 4 constructs, using the facility information 17 stored in the facility DB 14, links and nodes as with roads, targeting an area inside the parking lot where the user parks the vehicle. The facility information 17 includes, for example, information that identifies the location of an entrance/exit of the parking lot, information that identifies a layout of parking spaces in the parking lot, information about markings that mark off the parking spaces, and information about passages through which vehicles and pedestrians can pass. Using those pieces of information, a route that can be selected by the vehicle in the parking lot is identified, by which links and nodes are constructed. Note, however, that the above-described links and nodes may be constructed in advance for each parking lot across the country and stored in the facility DB 14.

Figure 5:
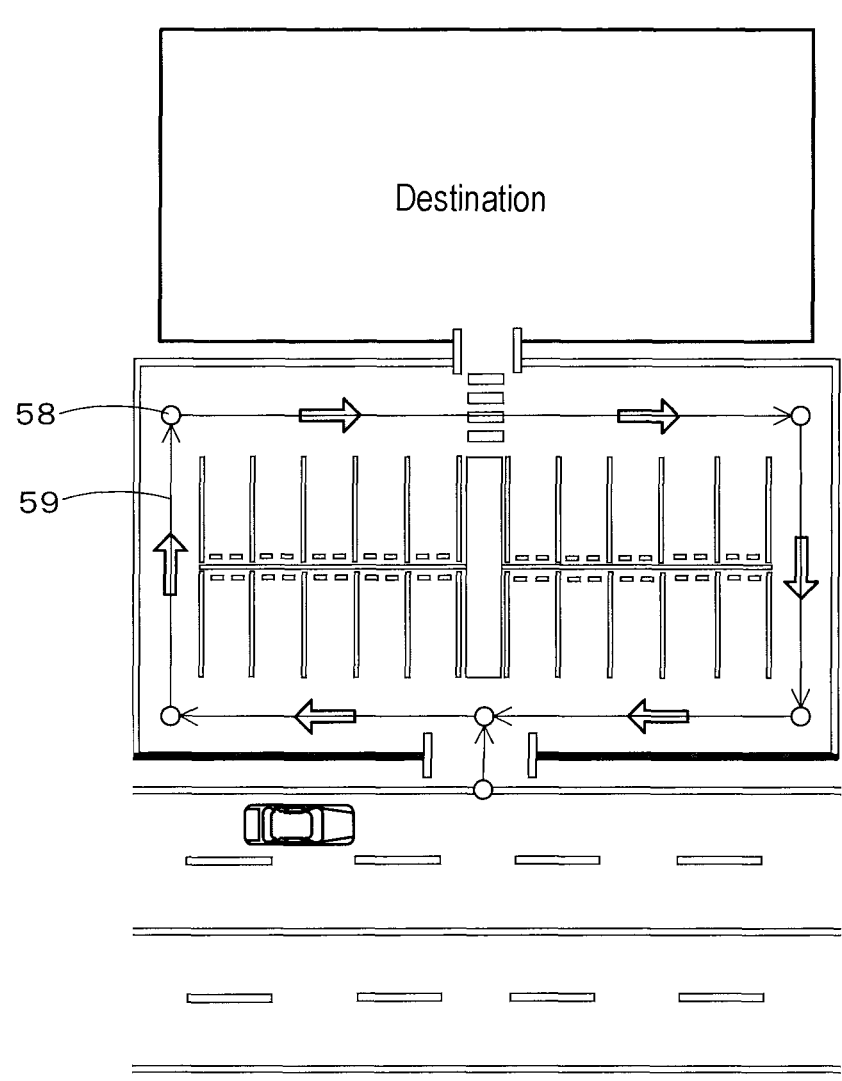
FIG. 5 is a diagram in which nodes and links that indicate passages of a vehicle are set in a parking lot.

Here, an example of links and nodes constructed for a parking lot at the above-described S3 is shown in FIG. 5. As shown in FIG. 5, a parking lot node 58 is set at each of an entrance/exit of a parking lot, an intersection at which passages through which vehicles can pass intersect each other, and corners and end points of passages through which vehicles can pass. On the other hand, a parking lot link 59 is set on a passage between parking lot nodes 58 through which vehicles can pass. In addition, the parking lot link 59 also has information that identifies a direction in which vehicles can pass through the passage in the parking lot. For example, FIG. 5 shows an example in which vehicles can pass through passages in the parking lot only in a clockwise direction. Note that although in the example shown in FIG. 5, parking lot nodes 58 are set at corners of passages through which vehicles can pass, instead of setting parking lot nodes 58 at the corners, a parking lot node 58 may be set only at a point at which there are a plurality of vehicle's traveling directions, like an intersection of passages.

In addition, as with links of roads, the parking lot nodes 58 and parking lot links 59 constructed as shown in FIG. 5 each are set with a cost and a direction (a direction in which vehicles can pass through a parking lot node). For example, each of parking lot nodes 58 corresponding to an intersection and the entrance/exit of the parking lot is set with a cost determined based on the content of the parking lot node 58, and is set with a direction in which vehicles can pass through upon passing through the parking lot node 58. Furthermore, each parking lot link 59 is set with a cost using, as a reference value, time required to move on the parking lot link 59. Namely, a higher cost is calculated for a parking lot link 59 that requires longer time for vehicles to move thereon.

Thereafter, the server device 4 calculates, using Dijkstra's algorithm, a total of costs to reach the recommended parking location from the current location of the vehicle via the entrance to the parking lot, and determines a route with the smallest total value to be a recommended travel route of the vehicle. Note that for a case in which the server device 4 has determined, by referring to connection information 18 indicating a connection relationship between a lane included in a road facing an entrance to a parking lot where the user parks the vehicle (hereinafter, referred to as entry road) and the entrance to the parking lot, that there is a limitation on a traveling direction in which the vehicle can enter the parking lot from the entry road (e.g., only an entry by a left turn is allowed), the server device 4 performs the above-described search for a travel route, taking into account also an entry direction. Note that for a method of searching for a route, search means other than Dijkstra's algorithm may be used. Note also that the search for a travel route at the above-described S3 may be performed by the navigation device 1 instead of the server device 4.

Then, at S4, the CPU 51 obtains high-precision map information 16, targeting an area including the travel route of the vehicle obtained at the above-described S3.

Figure 6:
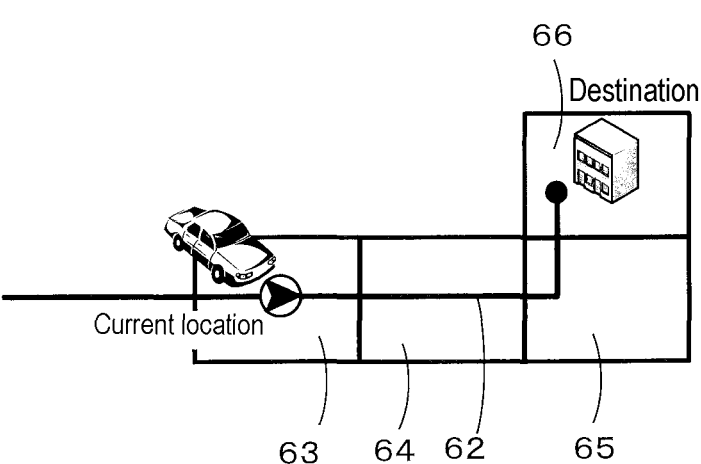
FIG. 6 is a diagram showing an area for which high-precision map information is obtained.

Here, the high-precision map information 16 is, as shown in FIG. 6, sectioned into rectangular shapes (e.g., 500 m×1 km) and stored in the high-precision map DB 13 of the server device 4. Thus, for example, when a route 62 is obtained as a travel route of the vehicle as shown in FIG. 6, high-precision map information 16 is obtained targeting areas 63 to 66 that include the route 62. Note, however, that when the distance to a parking lot where the user parks the vehicle is particularly far, for example, high-precision map information 16 may be obtained targeting only a secondary mesh in which the vehicle is currently located, or high-precision map information 16 may be obtained targeting only an area within a predetermined distance (e.g., within 3 km) from a current location of the vehicle.

The high-precision map information 16 includes, for example, information about the lane configurations of roads and markings (centerlines, lane lines, edge lines, guidelines, etc.) painted on the roads. In addition to the information, information about intersections, information about parking lots, etc., are also included. The high-precision map information 16 is basically obtained in units of the above-described rectangular areas from the server device 4, but when there is high-precision map information 16 for areas that is already stored in the cache 46, the high-precision map information 16 is obtained from the cache 46. In addition, the high-precision map information 16 obtained from the server device 4 is temporarily stored in the cache 46.

In addition, at the above-described S4, the CPU 51 also obtains facility information 17, targeting the parking lot in which the user parks the vehicle and which is identified at the above-described S1. Furthermore, there are also likewise obtained connection information 18 indicating a connection relationship between a lane included in an entry road facing an entrance to the parking lot where the user parks the vehicle and the entrance to the parking lot, and outside-the-road configuration information 19 that identifies a region between the entry road and the entrance to the parking lot where the user parks the vehicle, through which the vehicle can pass.

The facility information 17 includes, for example, information that identifies the location of an entrance/exit of the parking lot, information that identifies a layout of parking spaces in the parking lot, information about markings that mark off the parking spaces, and information about passages through which vehicles and pedestrians can pass. The facility information 17 may be, particularly, information generated by 3D modeling of the parking lot. In addition, the facility information 17, the connection information 18, and the outside-the-road configuration information 19 are basically obtained from the server device 4, but when corresponding information is already stored in the cache 46, the information is obtained from the cache 46. In addition, the facility information 17, connection information 18, and outside-the-road configuration information 19 obtained from the server device 4 are temporarily stored in the cache 46.

Thereafter, at S5, the CPU 51 generates a static travel path which is a travel path recommended for the vehicle to travel along to the recommended parking location determined at the above-described S2, based on the high-precision map information 16, facility information 17, connection information 18, and outside-the-road configuration information 19 obtained at the above-described S4. Note that the static travel path includes a first travel path recommended for the vehicle to travel along in lanes from a travel start point to the entry road facing the entrance to the parking lot, a second travel path recommended for the vehicle to travel along from the entry road to the entrance to the parking lot, and a third travel path recommended for the vehicle to travel along from the entrance to the parking lot to the recommended parking location where the vehicle is parked. Note, however, that when the distance to the parking lot where the user parks the vehicle is particularly far, only a first travel path may be generated targeting a section from a current location of the vehicle to a location a predetermined distance ahead in a traveling direction of the vehicle (e.g., an area within a secondary mesh in which the vehicle is currently located). Note that the predetermined distance can be changed as appropriate, and a static travel path is generated targeting a region including at least an area outside a range (detection range) in which road conditions around the vehicle can be detected using the exterior camera 39 and other sensors.

A process of generating a static travel path at the above-described S5 will be described in more detail below using drawings.

First, the CPU 51 obtains, based on the high-precision map information 16 obtained at the above-described S4, lane configurations, marking information, information about intersections, etc., targeting a section ahead in a traveling direction of the vehicle for which a static travel path is generated (e.g., an area within a secondary mesh including a current location of the vehicle). Subsequently, the CPU 51 constructs a lane network, targeting the section ahead in the traveling direction of the vehicle for which a static travel path is generated, based on the obtained lane configurations and marking information. Here, the lane network is a network representing movement into lanes that can be selected by the vehicle.

Figure 7:
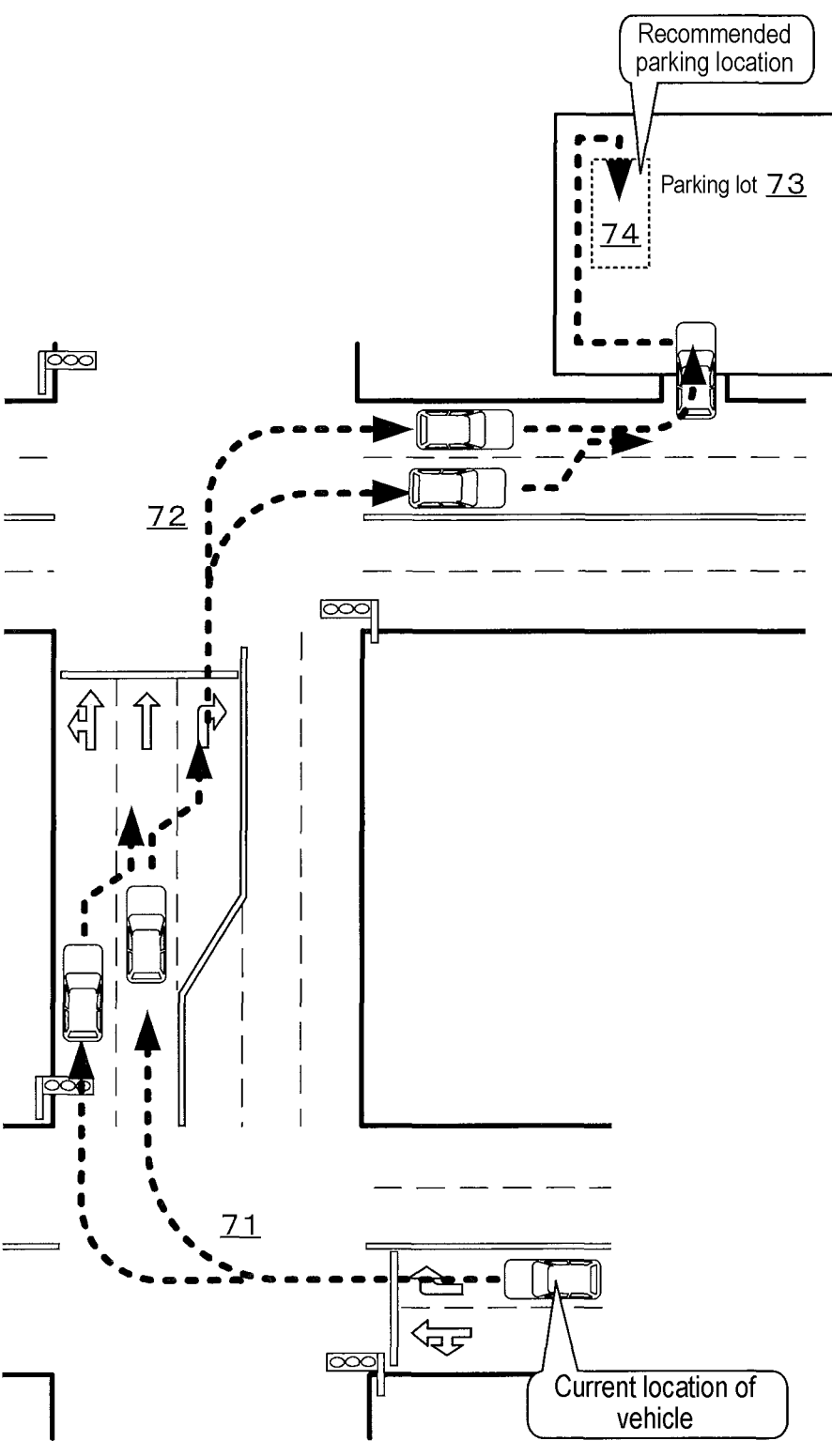
FIG. 7 is a diagram showing an example of a travel route to a recommended parking location.

Here, as an example of constructing a lane network at the above-described S5, for example, a case in which the vehicle travels on a planned travel route shown in FIG. 7 will be described as an example. The planned travel route shown in FIG. 7 is a route on which the vehicle travels straight ahead from its current location, and then turns right at a next intersection 71 and further turns right at a next intersection 72, too, and makes a left turn to enter a parking lot 73 that is where to park the vehicle, and moves to a recommended parking location 74. In the planned travel route shown in FIG. 7, for example, when the vehicle turns right at the intersection 71, the vehicle can enter a right lane or can also enter a left lane. Note, however, that since the vehicle needs to turn right at the next intersection 72, the vehicle needs to move into the far right lane at the time of entering the intersection 72. In addition, when the vehicle turns right at the intersection 72, too, the vehicle can enter a right lane or can also enter a left lane. Note, however, that since the vehicle needs to enter the parking lot 73 by making a left turn, the vehicle needs to move into the far left lane before reaching the parking lot 73. A lane network constructed targeting a section that allows such movement into lanes is shown in FIG. 8.

Figure 8:
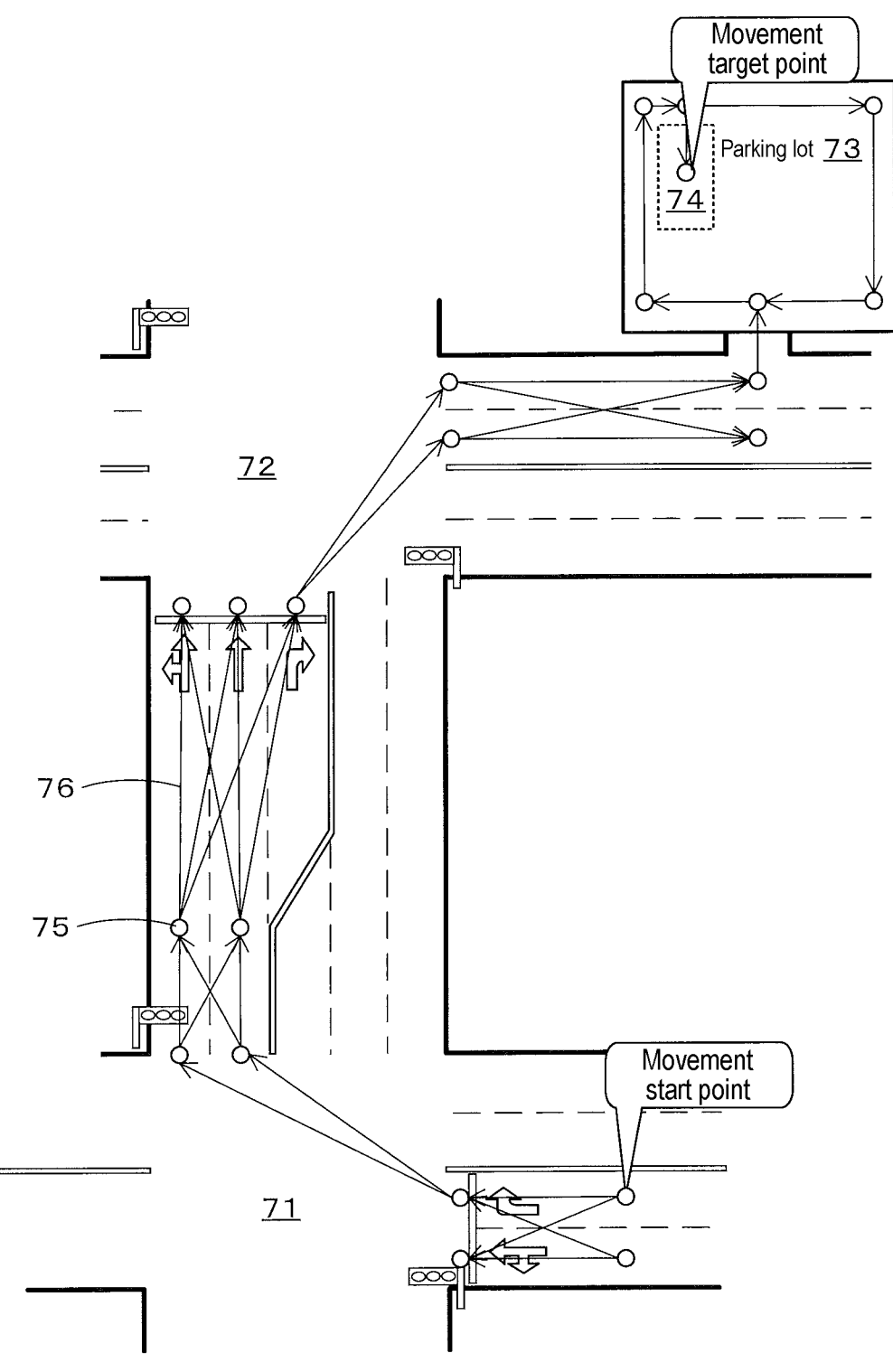
FIG. 8 is a diagram showing an example of a lane network constructed for the travel route shown in FIG. 7.

As shown in FIG. 8, in the lane network, a section ahead in a traveling direction of the vehicle for which a static travel path is generated is divided into a plurality of blocks (groups). Specifically, the section is divided, with a location where the vehicle enters an intersection, a location where the vehicle exits the intersection, and a location where the number of lanes increases or decreases being boundaries. A node point (hereinafter, referred to as lane node) 75 is set at a point in each lane located at a boundary of each divided block. Furthermore, a link (hereinafter, referred to as lane link) 76 that connects lane nodes 75 is set. In addition, using the facility information 17, connection information 18, and outside-the-road configuration information 19 obtained at the above-described S4, in the parking lot 73 where the vehicle is parked, too, likewise, lane nodes 75 and lane links 76 are set and further connected to the lane network present on a road side.

In addition, the above-described lane network includes, particularly, information that identifies, by a connection of lane nodes with a lane link at an intersection, a correspondence between a lane included in a road before passing through the intersection and a lane included in a road after passing through the intersection, i.e., a lane into which the vehicle can move after passing through the intersection from a lane used before passing through the intersection. Specifically, the lane network indicates that the vehicle can move between lanes corresponding to lane nodes that are connected by a lane link among lane nodes set on a road used before passing through an intersection and lane nodes set on a road used after passing through the intersection.

Then, for the constructed lane network, the CPU 51 sets a movement start point, at which the vehicle starts moving, at a lane node located at a starting point of the lane network, and sets a movement target point, which is a target to which the vehicle moves, at an end point of the lane network, i.e., a lane node provided at the recommended parking location 74.

Thereafter, the CPU 51 searches for a route that continuously connects the movement start point to the movement target point, by referring to the constructed lane network. For example, using Dijkstra's algorithm, a route with the smallest total value of lane costs is identified as a way of moving into lanes by the vehicle that is recommended when the vehicle moves. Note that the lane cost is set using, as a reference value, for example, the length of a lane link 76 or the time required to move on the lane link 76, and taking into account whether there is a lane change and the number of lane changes. Note, however, that search means other than Dijkstra's algorithm may be used provided that a route that continuously connects the movement start point to the movement target point can be searched.

Then, using the high-precision map information 16, facility information 17, connection information 18, and outside-the-road configuration information 19 obtained at the above-described S4, the CPU 51 generates a specific travel path for the vehicle to travel along the route identified by the above-described lane network. Note that for a travel path of a section involving lane changes, the locations of the lane changes are set such that the lane changes are not continuously made as much as possible and are made at locations away from an intersection. In addition, particularly, in a case of generating a travel path for making a left or right turn at an intersection or making a lane change, lateral acceleration (lateral G) occurring in the vehicle is calculated, and paths that are connected as smoothly as possible are calculated using clothoid curves on conditions that the lateral G does not interfere with autonomous driving assistance and does not exceed an upper limit value (e.g., 0.2 G) at which a passenger of the vehicle is not given discomfort. By performing the above-described process, a static travel path is generated which is a travel path recommended for the vehicle to travel along from a current location of the vehicle to the recommended parking location determined at the above-described S2.

Then, at S6, the CPU 51 creates a speed plan for the vehicle which is used upon traveling along the static travel path generated at the above-described S5, based on the high-precision map information 16 obtained at the above-described S4. For example, travel speeds of the vehicle recommended upon traveling along the static travel path are calculated taking into account speed limit information and speed change points (e.g., intersections, curves, railroad crossings, and crosswalks) present on the planned travel route.

Then, the speed plan created at the above-described S6 is stored in the flash memory 54, etc., as assistance information used for autonomous driving assistance. In addition, an acceleration plan indicating acceleration and deceleration of the vehicle required to implement the speed plan created at the above-described S6 may also be created as assistance information used for autonomous driving assistance.

Subsequently, at S7, the CPU 51 determines, as road conditions around the vehicle, particularly, whether a factor that affects travel of the vehicle is present around the vehicle, by performing image processing on a captured image having been captured with the exterior camera 39. Here, the "factor that affects travel of the vehicle" to be determined at the above-described S7 is a dynamic factor that changes in real time, and static factors based on road structures are excluded. The factor that affects travel of the vehicle corresponds, for example, to another vehicle that travels or is parked ahead in a traveling direction of the vehicle, a pedestrian located ahead in the traveling direction of the vehicle, or a construction zone present ahead in the traveling direction of the vehicle. On the other hand, intersections, curves, railroad crossings, merge areas, lane reduction areas, etc., are excluded. In addition, even if there is another vehicle, a pedestrian, or a construction zone, if there is no possibility of them overlapping a future travel path of the vehicle (e.g., if they are located away from the future travel path of the vehicle), then they are excluded from the "factor that affects travel of the vehicle". In addition, for means for detecting a factor that possibly affects travel of the vehicle, a sensor such as millimeter-wave radar or a laser sensor, vehicle-to-vehicle communication, or roadside-device-to-vehicle communication may be used instead of a camera.

In addition, for example, the real-time location of each vehicle traveling on a road across the country, etc., may be managed by an external server, and the CPU 51 may obtain the location of another vehicle located around the vehicle from the external server to perform the determination process at the above-described S7.

If it is determined that a factor that affects travel of the vehicle is present around the vehicle (S7: YES), then processing transitions to S8. On the other hand, if it is determined that a factor that affects travel of the vehicle is not present around the vehicle (S7: NO), then processing transitions to S11.

Figure 9:
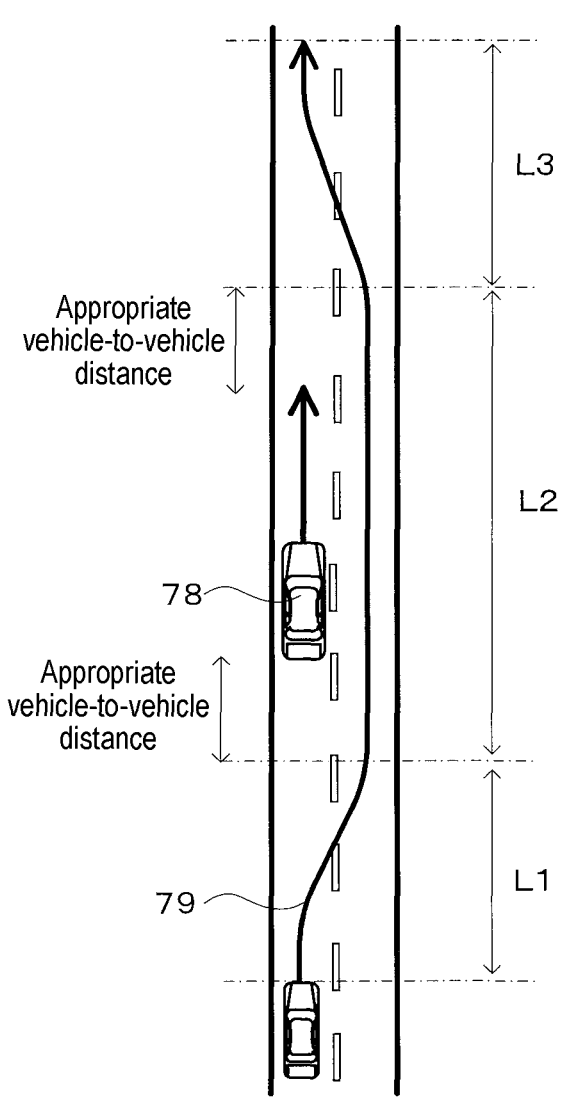
FIG. 9 is a diagram describing a method of calculating a dynamic travel path.

At S8, the CPU 51 generates, as a dynamic travel path, a new path for the vehicle to travel from the current location of the vehicle, and avoid or follow the "factor that affects travel of the vehicle" detected at the above-described S7, and then return to the static travel path. Note that the dynamic travel path is generated targeting a section including the "factor that affects travel of the vehicle". Note also that the length of the section varies depending on what the factor is. For example, when the "factor that affects travel of the vehicle" is another vehicle (lead vehicle) traveling ahead of the vehicle, as shown in FIG. 9, an avoidance path which is a path where the vehicle makes a lane change to the right to pass a lead vehicle 78, and then makes a lane change to the left to return to an original lane is generated as a dynamic travel path 79. Note that a following path which is a path where the vehicle travels following the lead vehicle 78 from behind at a predetermined distance without passing the lead vehicle 78 (or travels side by side with the lead vehicle 78) may be generated as a dynamic travel path.

A method of calculating the dynamic travel path 79 shown in FIG. 9 will be described as an example. The CPU 51 first calculates a first path L1 required for the vehicle to move into a right lane by starting a turn of the steering and for the steering position to return to a straight-ahead direction. Note that for the first path L1, a path that is as smooth as possible and has the shortest possible distance required for a lane change is calculated using a clothoid curve on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance D or more between the vehicle and the lead vehicle 78 is another condition.

Then, a second path L2 is calculated where the vehicle travels in the right lane with a speed limit being an upper limit, to pass the lead vehicle 78 and travels until an appropriate vehicle-to-vehicle distance D or more between the vehicle and the lead vehicle 78 is obtained. Note that the second path L2 is basically a straight path, and the length of the path is calculated based on the vehicle speed of the lead vehicle 78 and the speed limit for the road.

Subsequently, a third path L3 is calculated that is required for the vehicle to return to the left lane by starting a turn of the steering and for the steering position to return to the straight-ahead direction. Note that for the third path L3, a path that is as smooth as possible and has the shortest possible distance required for a lane change is calculated using a clothoid curve on conditions that lateral acceleration (lateral G) occurring upon making a lane change does not interfere with autonomous driving assistance and does not exceed an upper limit value (e.g., 0.2 G) at which a passenger of the vehicle is not given discomfort, the lateral G being calculated based on the current vehicle speed of the vehicle. In addition, maintaining an appropriate vehicle-to-vehicle distance D or more between the vehicle and the lead vehicle 78 is another condition.

Note that a dynamic travel path is generated based on road conditions around the vehicle which are obtained using the exterior camera 39 and other sensors, and thus, a region for which a dynamic travel path is to be generated is at least an area within a range (detection range) in which road conditions around the vehicle can be detected using the exterior camera 39 and other sensors.

Subsequently, at S9, the CPU 51 reflects the dynamic travel path which is newly generated at the above-described S8 in the static travel path generated at the above-described S5. Specifically, a cost of a portion of the static travel path included in an area from the current location of the vehicle to the end of the section including the "factor that affects travel of the vehicle" and a cost of a portion of the dynamic travel path included in the area are calculated, and a travel path with a minimum cost is selected. Consequently, a part of the static travel path is replaced by the dynamic travel path as necessary. Note that depending on the situation, replacement by the dynamic travel path may not be performed, i.e., even if reflection of the dynamic travel path is performed, there may be no change in the static travel path generated at the above-described S5. Furthermore, when the dynamic travel path and the static travel path are identical paths, even if replacement is performed, there may be no change in the static travel path generated at the above-described S5.

Then, at S10, the CPU 51 modifies, for the static travel path in which the dynamic travel path has been reflected at the above-described S9, the speed plan for the vehicle created at the above-described S6, based on a change made by the reflected dynamic travel path. Note that when there is no change in the static travel path generated at the above-described S5 as a result of reflecting the dynamic travel path, the process at S10 may be omitted.

Subsequently, at 511, the CPU 51 computes the amounts of control for the vehicle to travel along the static travel path generated at the above-described S5 (when the dynamic travel path is reflected at the above-described S9, a path obtained after the reflection) at speeds in accordance with the speed plan created at the above-described S6 (when the speed plan is modified at the above-described S10, a plan obtained after the modification). Specifically, each of the amounts of control of an accelerator, a brake, a gear, and steering is computed. Note that the processes at S11 and S12 may be performed by the vehicle control ECU 40 that controls the vehicle, instead of the navigation device 1.

Thereafter, at S12, the CPU 51 reflects the amounts of control computed at S11. Specifically, the computed amounts of control are transmitted to the vehicle control ECU 40 through the CAN. The vehicle control ECU 40 performs vehicle control of each of the accelerator, the brake, the gear, and the steering based on the received amounts of control. As a result, it becomes possible to perform travel assistance control for traveling along the static travel path generated at the above-described S5 (when the dynamic travel path is reflected at the above-described S9, a path obtained after the reflection) at speeds in accordance with the speed plan created at the above-described S6 (when the speed plan is modified at the above-described S10, a plan obtained after the modification).

Then, at S13, the CPU 51 determines whether the vehicle has traveled a certain distance since the generation of a static travel path at the above-described S5. For example, the certain distance is 1 km.

If it is determined that the vehicle has traveled a certain distance since the generation of a static travel path at the above-described S5 (S13: YES), then processing returns to S4. Thereafter, a static travel path is generated again, targeting a section within the predetermined distance from a current location of the vehicle along the travel route (S4 to S6). Note that, in the present embodiment, every time the vehicle has traveled a certain distance (e.g., 1 km), a static travel path is repeatedly generated targeting a section within the predetermined distance from a current location of the vehicle along the travel route, but when the distance to the destination is short, a static travel path to the destination may be generated once at the time of starting traveling.

On the other hand, if it is determined that the vehicle has not traveled a certain distance since the generation of a static travel path at the above-described S5 (S13: NO), then it is determined whether to terminate the assistance travel by autonomous driving assistance (S14). A case of terminating the assistance travel by autonomous driving assistance includes a case in which the travel by autonomous driving assistance is intentionally canceled (override) by the user operating a control panel provided on the vehicle or by the user performing a steering wheel operation, a brake operation, etc., in addition to a case in which the vehicle has reached the destination.

If it is determined to terminate the assistance travel by autonomous driving assistance (S14: YES), then the autonomous driving assistance program is terminated. On the other hand, if it is determined to continue the assistance travel by autonomous driving assistance (S14: NO), then processing returns to S7.

Next, a subprocess of the parking location determination process performed at the above-described S2 will be described based on FIG. 10. FIG. 10 is a flowchart of a subprocess program of the parking location determination process.

First, at S21, the CPU 51 obtains the location of a destination which is a user's movement target. Note that particularly, when the destination is a tenant in a complex commercial facility having a plurality of tenants, the location of the tenant which is the destination in a building in the complex commercial facility is also obtained.

Then, at S22, the CPU 51 obtains facility information 17, targeting a facility which is the user's destination and the parking lot in which the user parks the vehicle and which is identified at the above-described S1. Note that particularly, when the destination is a tenant in a complex commercial facility having a plurality of tenants, facility information 17 of the entire complex commercial facility including the destination is obtained. The facility information 17 includes, particularly, for a parking lot, information that identifies the location of an entrance/exit of the parking lot, information that identifies a layout of parking spaces in the parking lot, information about markings that mark off the parking spaces, and information about passages through which vehicles and pedestrians can pass. For a facility other than parking lots, information that identifies a facility floor plan is included. The floor plan includes, for example, information that identifies the locations of entrances and exits, passages, stairs, elevators, and escalators. In addition, for a complex commercial facility having a plurality of tenants, information that identifies the location of each tenant that occupies the complex commercial facility is included. The facility information 17 may be, particularly, information generated by 3D modeling of the parking lot or the facility. In addition, the facility information 17 is basically obtained from the server device 4, but when corresponding information is already stored in the cache 46, the information is obtained from the cache 46.

Subsequently, at S23, the CPU 51 constructs an in-building network which is a network representing a route that can be selected in the building having the destination, with moving means (e.g., walking or a wheelchair) which is used after getting out of the vehicle, based on the location of the destination obtained at the above-described S21 and the facility information 17 obtained at the above-described S22. Particularly, when the destination is a tenant in a complex commercial facility having a plurality of tenants, a network of the entire building in the complex commercial facility having the tenant which is the destination is constructed. On the other hand, when the destination is not a tenant in a complex commercial facility, an entrance to a building is the destination (i.e., movement in the building is not included in a route to the destination), and thus, basically, construction of an in-building network at S23 is not performed, but an in-building network may be constructed.

The facility information 17 obtained at the above-described S22 includes information that identifies a facility floor plan. The floor plan includes, for example, information that identifies regions through which pedestrians can pass, such as the locations of entrances and exits, passages, stairs, elevators, and escalators. In addition, for a complex commercial facility having a plurality of tenants, information that identifies the location of each tenant that occupies the complex commercial facility is included. Using those pieces of information, a route in the building that can be selected by the user is identified, by which an in-building network is generated.

Figure 11:
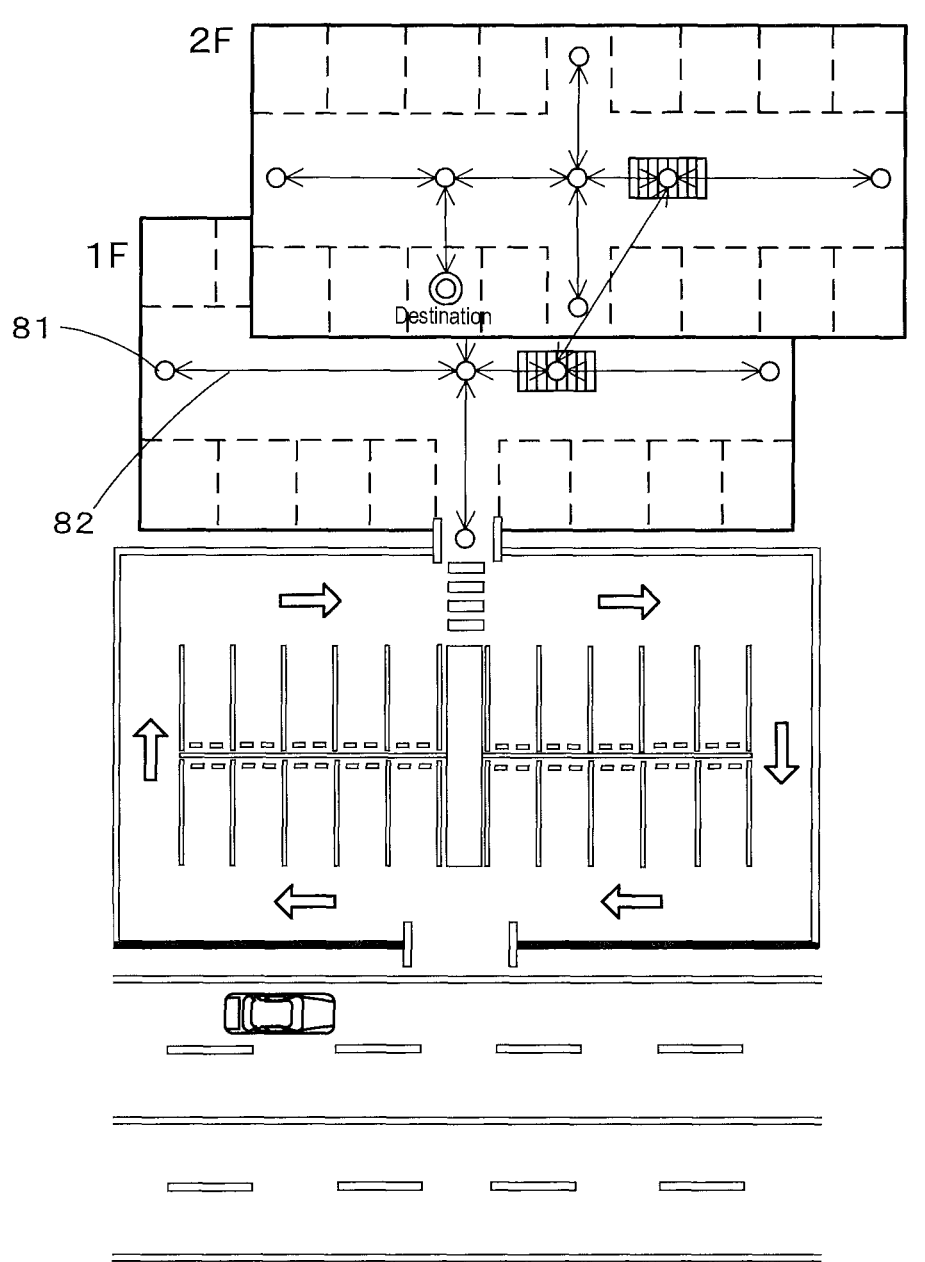
FIG. 11 is a diagram showing an example of an in-building network constructed in a building having a destination.

An example of the in-building network constructed at the above-described S23 is shown in FIG. 11. Particularly, FIG. 11 shows an example of a case in which the destination is a tenant in a complex commercial facility having a plurality of tenants. As shown in FIG. 11, an in-building network is constructed using walking nodes 81 and walking links 82. Note that a walking node 81 is set at each of an intersection at which passages through which pedestrians can pass in a building intersect each other, end points and corners of passages through which pedestrians can pass, entrances and exits of the building, stairs, elevators, escalators, etc. Furthermore, walking nodes 81 are also set at the tenant which is the destination and at a point on a passage facing the tenant. On the other hand, a walking link 82 is set in a region between walking nodes 81 through which pedestrians can pass. Note that the region through which pedestrians can pass corresponds to a passage through which pedestrians can pass (also including stairs, an escalator, a crosswalk, a footbridge, and a moving walkway). In addition, the walking link 82 also has information that identifies a direction in which pedestrians can pass.

Then, at S24, using information on markings that mark off parking spaces in the parking lot where the user parks the vehicle among the pieces of facility information 17 obtained at the above-described S22, the CPU 51 forms a network of the markings of the parking spaces, each marking serving as one of passages through which the user can pass. Specifically, as shown in FIG. 12, a walking node 81 is set at each end point of markings that mark off a parking space 85 (i.e., four corners of the parking space 85), and walking links 82 are set between the walking nodes 81, by which a network is constructed.

Figure 12:
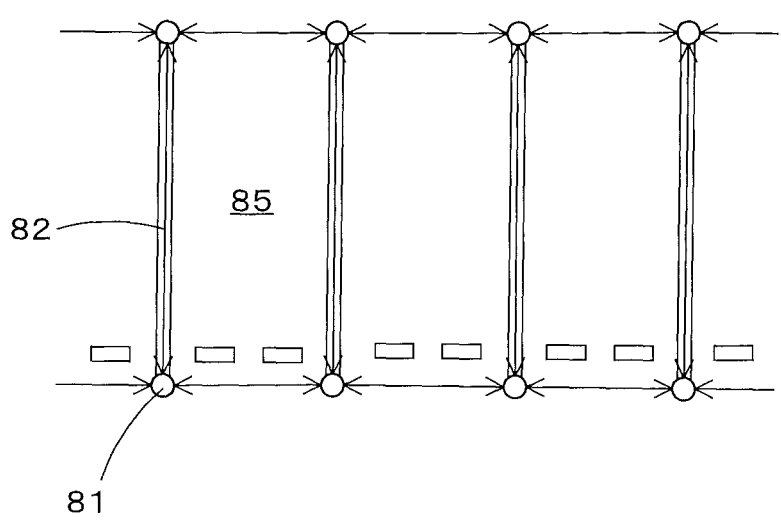
FIG. 12 is a diagram showing a network constructed for markings in a parking lot.

Here, for formation of a network of markings of parking spaces, as shown in FIG. 12, regardless of whether markings are actually painted on a road surface, a network is set at boundaries that enclose rectangular parking spaces 85 (i.e., in a rectangular shape). For example, in an example shown in FIG. 12, markings are actually painted only on left and right boundaries of a parking space 85, but walking links 82 are set considering that markings are also painted on front and back boundaries of the parking space 85. Note, however, that walking links 82 may be set only at boundaries where markings are actually painted. Note also that each marking present in the parking lot may be associated in advance with an attribute that identifies whether the marking is a marking on which pedestrians can pass, and at the above-described S24, a network may be constructed targeting only markings on which pedestrians can pass.

Thereafter, at S25, using further the facility information 17 of the parking lot where the user parks the vehicle, in addition to the network of markings constructed at the above-described S24, the CPU 51 constructs a parking lot network which is a network representing a route that can be selected in the parking lot where the user parks the vehicle, with the moving means (e.g., walking or a wheelchair) which is used after getting out of the vehicle. In addition, when the building having the destination is away from the parking lot where the vehicle is parked, and the user needs to move, after parking, on foot on roads outside the parking lot, a parking lot network is also likewise constructed for the roads between the parking lot and the building.

The facility information 17 of the parking lot includes information that identifies the location of an entrance/exit of the parking lot, information that identifies a layout of parking spaces in the parking lot, information about markings that mark off the parking spaces, and information about passages through which vehicles and pedestrians can pass. Using those pieces of information, a route in the parking lot that can be selected by the user is identified, by which a parking lot network is generated.

Figure 13:
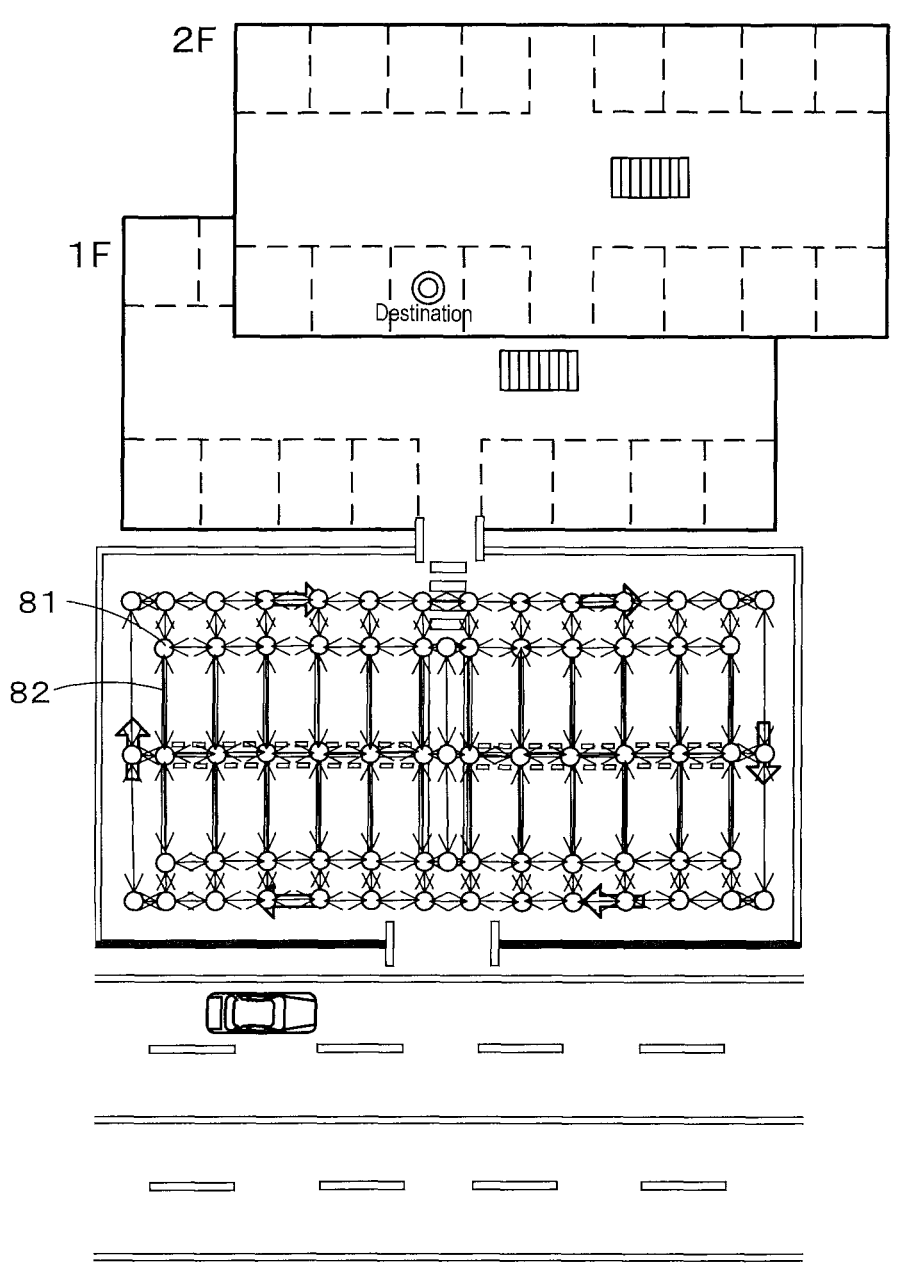
FIG. 13 is a diagram showing an example of a parking lot network constructed in a parking lot where the vehicle is parked.

An example of the parking lot network constructed at the above-described S25 is shown in FIG. 13. As shown in FIG. 13, a parking lot network is constructed using walking nodes 81 and walking links 82. Note that in addition to the network of markings constructed at the above-described S24 (FIG. 12), a walking node 81 is set at each of an intersection at which passages through which pedestrians can pass intersect each other (in addition to passages dedicated for pedestrians, passages through which vehicles can pass may also be included; the same also applies hereinafter), end points and corners of passages through which pedestrians can pass, etc. A walking node 81 is also set at a point on a passage facing a walking node 81 included in the network of markings. On the other hand, a walking link 82 is set in a region between walking nodes 81 through which pedestrians can pass. Note that the region through which pedestrians can pass corresponds to a passage through which only pedestrians can pass (also including stairs, an escalator, a crosswalk, a footbridge, and a moving walkway) in addition to a passage on which vehicles can also travel, and a marking in a parking space. In addition, the walking link 82 also has information that identifies a direction in which pedestrians can pass.

Figure 14:
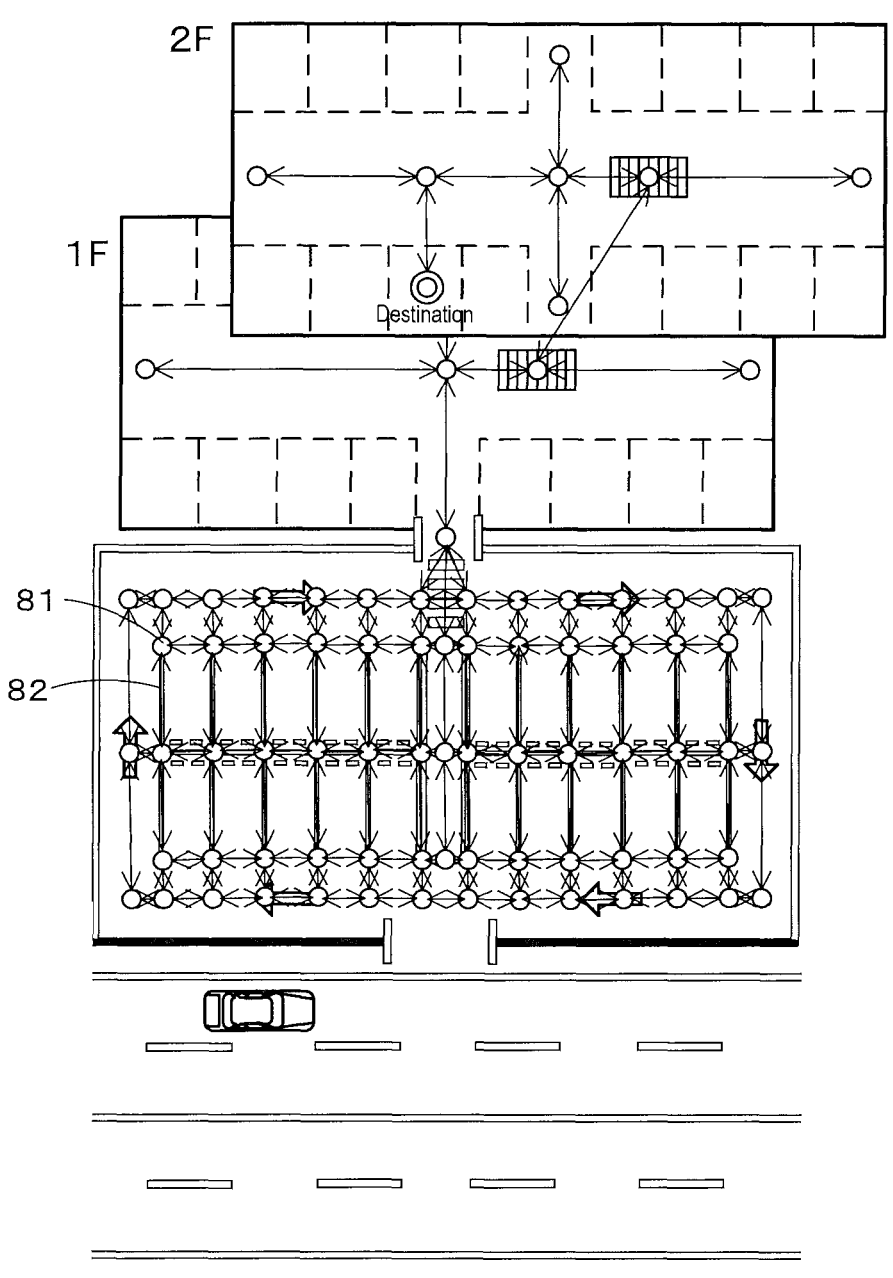
FIG. 14 is a diagram showing an example of a network obtained by connecting the in-building network to the parking lot network.

Subsequently, at S26, the CPU 51 connects, by a new walking link 82, a walking node 81 corresponding to an entrance to the building in the in-building network constructed at the above-described S23 to a walking node 81 of the parking lot network constructed at the above-described S25 that is present near the walking node 81 corresponding to the entrance to the building. Note that the number of walking links 82 to be connected does not need to be one, and the walking nodes 81 are connected together using walking links 82 whose number corresponds to the number of routes that allow an entry into the entrance to the building from a parking lot side. As a result, as shown in FIG. 14, the in-building network is connected to the parking lot network. A network generated at the above-described S26 is a network representing a route that can be selected for the user to move across both areas, in the parking lot and the building, after getting out of the vehicle.

Note that when the destination is not a tenant in a complex commercial facility, an entrance to a building is the destination (i.e., movement in the building is not included in a route to the destination), and thus, at the above-described S23, an in-building network is not constructed. In that case, at the above-described S26, the CPU 51 adds a walking node 81 to the entrance to the building (destination) and connects the added walking node 81 to a nearby parking lot network by a new walking link 82.

Subsequently, at S27, the CPU 51 obtains a parking location (parking space) which is a candidate for the user to park the vehicle in the parking lot in which the user parks the vehicle and which is obtained at the above-described 51. For example, open states of parking spaces are obtained from an external server that manages the parking lot, and an open parking space at the present time is obtained as a parking location which is a candidate for the user to park the vehicle. When there are a plurality of candidates, a plurality of parking locations are obtained. Note, however, that when there are a significant number of open parking spaces, the number of candidates may be narrowed down to a certain extent, using a condition such as a location.

Then, at S28, the CPU 51 estimates the location of a driver's seat, assuming that the vehicle is parked at the parking location which is a candidate for the user to park the vehicle (hereinafter, referred to as candidate parking location) and which is obtained at the above-described S27 (i.e., a location at which the user gets in and out of the vehicle when the vehicle is parked at the candidate parking location; hereinafter, referred to as get-in/out-of-vehicle location). Note that whether the user performs forward parking or reverse parking at the candidate parking location is estimated taking into account, for example, house rules for the parking lot or a configuration of the parking lot.

Subsequently, at S29, the CPU 51 sets costs and directions (directions in which the user can pass through walking nodes), particularly, for the walking nodes 81 of the network that is finally constructed at the above-described S26 (a network obtained by connecting the in-building network to the parking lot network). For example, each of walking nodes 81 corresponding to intersections, stairs, elevators, and escalators is set with a cost determined based on the content of the walking node 81, and is set with a direction in which the user can pass through upon passing through the walking node 81.

In addition, costs are also set for the walking links 82. For the cost of a walking link 82, time required to move on the walking link 82 is used as a reference value. Namely, a higher cost is calculated for a walking link 82 that requires longer time for the user to move thereon. Time required to move on a walking link 82 is calculated by multiplying moving speed by the length of the link. Furthermore, the moving speed is, for example, a fixed value (e.g., 1 m/s) that takes into account moving speed for walking.

In addition, particularly, for the cost of a walking link 82, the above-described reference value is corrected on the following conditions (1) and (2).

(1) For the cost of a walking link 82 where the user moves using stairs, an elevator, or an escalator, the reference value is multiplied by a predetermined value determined based on the type, i.e., stairs, an elevator, or an escalator. Here, for the predetermined value to be multiplied, the stairs have the largest predetermined value (e.g., 1.3), the escalator has the second largest predetermined value (e.g., 0.9), and the elevator has the smallest predetermined value (e.g., 0.8). In addition, for a walking link 82 where the user moves using an elevator, it is desirable to set a reference value for cost based on the number of floors to which the user moves. For example, the reference value is set to 3 seconds per movement for one floor. Furthermore, if elevator wait time (which may be average wait time) can be grasped, then it is desirable to also add the wait time.

(2) For the cost of a walking link 82, a predetermined value is added or multiplied depending on the configuration and type of a passage on which the user moves. For example, for the cost of a walking link 82 having a door in the middle thereof, taking into account time required to open and close the door, a predetermined value (e.g., 3 seconds per door) is added to the reference value. In addition, for the cost of a walking link 82 where the user moves on a passage other than passages dedicated for pedestrians, since the user needs to move watching for vehicles, etc., a predetermined value (e.g., 1.2) is multiplied, taking into account a burden on the movement. In addition, for the cost of a walking link 82 where the user moves on an outdoor passage with no roof, a correction is made based on the current weather, hours, and temperature. For example, in a case of rainy weather, a case of a low or high temperature (e.g., 0° C. or lower or 30° C. or higher), or a case of nighttime, since movement is a burden, a predetermined value (e.g., 1.2) is multiplied. On the other hand, for the cost of a walking link 82 where the user moves on a moving walkway, reversely, a correction is made by performing a subtraction on the reference value (e.g., 0.9 is multiplied).

Thereafter, at S30, using Dijkstra's algorithm, the CPU 51 searches for a route from the get-in/out-of-vehicle location to the destination for one candidate parking location or each of a plurality of candidate parking locations obtained at the above-described S27. Note that when the destination is a tenant in a complex commercial facility, the destination is the location of the corresponding tenant in a building, and when the destination is not a tenant in a complex commercial facility, the destination is an entrance to a building. Specifically, at the above-described S30, the CPU 51 calculates a total value of costs of walking nodes 81 and walking links 82 for a route that connects a get-in/out-of-vehicle location at each candidate vehicle location to the destination in the network that is finally constructed at the above-described S26. Note that for a method of searching for a route, search means other than Dijkstra's algorithm may be used.

Furthermore, at S31, using the costs calculated for the network at the above-described S30, the CPU 51 outputs a route with a minimum total cost among routes each connecting each get-in/out-of-vehicle location to the destination.

The route outputted at the above-described S31 is a recommended route with a minimum burden on the user moving to the destination from the parking location after the user parks the vehicle in the parking lot. In addition, a candidate vehicle location corresponding to a get-in/out-of-vehicle location located at a starting point of the route outputted at the above-described S31 is a recommended parking location that is recommended to park the vehicle. Thus, by the processes from the above-described S21 to S31, a recommended parking location is finally determined. Thereafter, processing transitions to S3, and a travel path of the vehicle from a current location of the vehicle to the determined recommended parking location is calculated, and furthermore, driving assistance for the vehicle is provided in accordance with the calculated travel path (S3 to S12).

Figure 15:
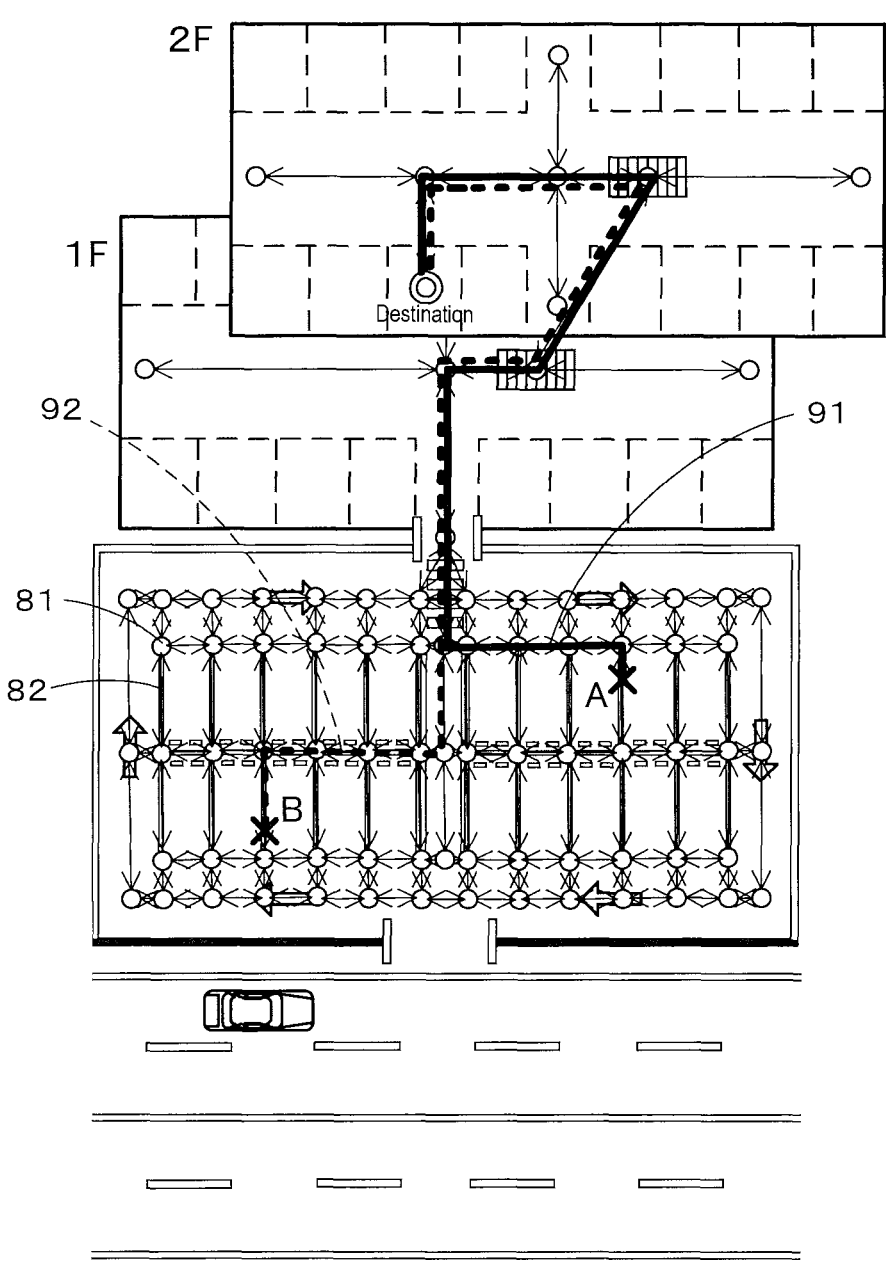
FIG. 15 is a diagram describing a method of identifying a parking location recommended for parking.

Here, the total of costs calculated for the network at the above-described S30 is cost incurred in user's movement made from the parking location after getting out of the vehicle, and thus, a recommended parking location is determined taking into account a burden on user's movement after parking. For example, as shown in FIG. 15, when there are two parking spaces, a parking space A and a parking space B, as candidate parking locations for parking the vehicle at the destination, by comparison of routes 91 and 92 used for movement after getting out of the vehicle, the route 91 used when the vehicle is parked in the parking space A has a shorter period of time required for the user to move in a parking lot and in a building before reaching a tenant which is the destination, and thus, it can be said that the parking space A is an appropriate parking space for parking the vehicle. Thus, the parking space A is selected as a recommended parking location. In the present embodiment, as described above, a recommended parking location is selected using an in-building network and a parking lot network and based on a total of costs that takes into account a burden on the user moving across both areas, in a parking lot and a building, after getting out of the vehicle, by which it becomes possible to select a more optimal parking location for the user to park the vehicle.

In addition, in the above-described implementation example, a recommended parking location is selected taking into account a burden on the user moving to the destination after parking, but a recommended parking location may be selected taking into account also a burden on user's movement upon going back home from the destination. For example, a route with a minimum cost may be searched, including a return route from the destination to a parking location in addition to an outward route to the destination, and a recommended parking location may be selected. As a result, it become possible to select a recommended parking location taking into account time required to move to a parking location upon going back home from the destination.

In addition, in the above-described implementation example, a network including all of movement in the parking lot and movement in the building after parking the vehicle is generated by connecting the in-building network constructed at the above-described S23 to the parking lot network constructed at the above-described S25, and costs are computed for the network, but costs may be individually computed for the in-building network and the parking lot network.

As described in detail above, the navigation device 1 and a computer program executed by the navigation device 1 according to the present embodiment obtain a parking lot network which is a network representing a route that can be selected in a parking lot by the user with moving means which is used after getting out of the vehicle (S25), obtain an in-building network which is a network representing a route that can be selected in a building by the user with the moving means which is used after getting out of the vehicle (S23), and search for a recommended route from a parking location where the vehicle is parked in the parking lot to a destination present in the building, using a network obtained by connecting the parking lot network to the in-building network (S30 and S31), and thus, it becomes possible to appropriately search for a recommended route for the user to move across both areas, in the parking lot and the building, after getting out of the vehicle, without selecting a route on which the user cannot pass or a route that is difficult for the user to pass on.

In addition, in the parking lot network, markings of parking spaces provided in the parking lot are included in a route that can be selected by the user with the moving means which is used after getting out of the vehicle, and thus, it becomes possible to appropriately grasp a route on which the user may move in the parking lot, based on information about the parking lot.

In addition, when there are a plurality of candidate parking locations which are parking locations serving as candidates for parking the vehicle in the parking lot, a recommended route from each of the plurality of candidate parking locations to the destination present in the building is searched (S30), and a parking location recommended to park the vehicle is selected from the plurality of candidate parking locations, based on results of the search for a recommended route (S31), and thus, it becomes possible to select an appropriate parking location to park the vehicle, taking into account a user's burden on the user moving in the parking lot and in the building after parking.

In addition, the location of a driver's seat in a state in which the vehicle is parked at the parking location is estimated (S28) and a recommended route from the location of the driver's seat in a state in which the vehicle is parked at the parking location to the destination present in the building is searched (S30 and S31), and thus, it becomes possible to search for an accurate recommended route for the user to move from a point where the user gets out of the vehicle to the destination.

Note that the present disclosure is not limited to the above-described embodiment, and it is, of course, possible to make various modifications and alterations thereto without departing from the spirit and scope of the present disclosure.

For example, in the present embodiment, first, one parking location where the vehicle is parked is determined (S2) and then a travel route to the determined parking location is searched (S3), but at S2, the number of parking locations is not necessarily need to be limited to one, and for example, a plurality of candidates for a parking location may remain. Then, of the plurality of candidates, a parking location may be finally determined at timing at which a travel route is searched at S3 or at which a static travel path is generated at S5.

In addition, in the present embodiment, a case is assumed in which a travel start point of the vehicle is on a road, but the present disclosure is also applicable to a case in which the travel start point is in a parking lot. In that case, there are calculated both a travel path recommended for the vehicle to travel along from the travel start point to an exit of the parking lot and a travel path recommended for the vehicle to travel along from the exit of the parking lot to a road facing the exit of the parking lot.

In addition, in the present embodiment, a recommended route from a parking location where the vehicle is parked in the parking lot to the destination present in the building is searched, and a parking location recommended to park the vehicle is selected based on results of the search (S31), but it is also possible to omit subsequent processes at and after S3 related to driving assistance for the vehicle. For example, the navigation device 1 may be a device that provides the user with guidance on a parking location recommended for parking or guidance on a recommended walking route from the parking location to the destination, without generating a travel path and performing vehicle control based on the travel path.

In addition, in the present embodiment, as a recommended parking location, a specific one parking space where the vehicle is parked is identified from among a plurality of parking spaces provided in the parking lot, but a wider area may be identified. For example, when a parking lot includes a plurality of areas, an area where the vehicle is parked may be identified. In addition, when there are a plurality of parking lots as candidates for parking, a parking lot may be identified.

In addition, in the present embodiment, a static travel path that is finally generated is information that identifies a specific path (a set of coordinates and lines) where the vehicle travels, but such a level of information that does not identify a specific path but can identify roads and lanes where the vehicle is to travel may be obtained. In addition, instead of identifying a specific travel path, only roads on which the vehicle travels and a parking location where the vehicle is parked in a parking lot may be identified.

In addition, in the present embodiment, a lane network, an in-building network, and a parking lot network are generated using the high-precision map information 16 and the facility information 17 (S5, S23, and S25), but networks that target roads, buildings, and parking lots across the country may be stored in advance in a DB, and the networks may be read from the DB as necessary.

In addition, in the present embodiment, high-precision map information included in the server device 4 includes both information about the lane configurations of roads (lane-by-lane road configurations, curvatures, lane widths, etc.) and information about markings (centerlines, lane lines, edge lines, guidelines, etc.) painted on the roads, but may include only the information about markings or may include only the information about the lane configurations of roads. For example, even if only the information about markings is included, it is possible to estimate information corresponding to the information about the lane configurations of roads, based on the information about markings. In addition, even if only the information about the lane configurations of roads is included, it is possible to estimate information corresponding to the information about markings, based on the information about the lane configurations of roads. In addition, the "information about markings" may be information that identifies the types or layout of markings themselves that mark off lanes, or may be information that identifies whether a lane change can be made between adjacent lanes, or may be information that directly or indirectly identifies the configurations of lanes.

In addition, in the present embodiment, as means for reflecting a dynamic travel path in a static travel path, a part of the static travel path is replaced by the dynamic travel path (S9), but instead of replacement, the static travel path may be modified to approximate to the dynamic travel path.

In addition, the present embodiment describes that autonomous driving assistance for performing autonomous travel independently of user's driving operations refers to control, by the vehicle control ECU 40, of all of an accelerator operation, a brake operation, and a steering wheel operation which are operations related to the behavior of the vehicle among vehicle operations. However, the autonomous driving assistance may refer to control, by the vehicle control ECU 40, of at least one of an accelerator operation, a brake operation, and a steering wheel operation which are operations related to the behavior of the vehicle among vehicle operations. On the other hand, it is described that manual driving by user's driving operations refers to performing, by the user, of all of an accelerator operation, a brake operation, and a steering wheel operation which are operations related to the behavior of the vehicle among vehicle operations.

In addition, driving assistance of the present disclosure is not limited to autonomous driving assistance related to autonomous driving of the vehicle. For example, it is also possible to provide driving assistance by displaying the static travel path identified at the above-described S5 or the dynamic travel path generated at the above-described S8 on a navigation screen and providing guidance using voice, a screen, etc. (e.g., guidance on a lane change or guidance on a recommended vehicle speed). In addition, user's driving operations may be assisted by displaying a static travel path or a dynamic travel path on a navigation screen.

In addition, in the present embodiment, a configuration is adopted in which the autonomous driving assistance program (FIG. 4) is executed by the navigation device 1, but a configuration may be adopted in which the autonomous driving assistance program is executed by an in-vehicle device other than the navigation device 1 or by the vehicle control ECU 40. In that case, a configuration is adopted in which the in-vehicle device or the vehicle control ECU 40 obtains a current location of the vehicle, map information, etc., from the navigation device 1 or the server device 4. Furthermore, the server device 4 may perform some or all of the steps of the autonomous driving assistance program (FIG. 4). In that case, the server device 4 corresponds to a driving assistance device of the present application.

In addition, the present disclosure can also be applied to mobile phones, smartphones, tablet terminals, personal computers, etc. (hereinafter, referred to as portable terminals, etc.) in addition to navigation devices. In addition, aspects of the present disclosure can also be applied to a system including a server and a portable terminal, etc. In that case, a configuration may be adopted in which each step of the above-described autonomous driving assistance program (see FIG. 4) is performed by either one of the server and the portable terminal, etc. Note, however, that when the aspect of the present disclosure are applied to a portable terminal, etc., a vehicle that can provide autonomous driving assistance and the portable terminal, etc. need to be connected to each other such that they can communicate with each other (it does not matter whether they are connected by wire or wirelessly).

REFERENCE SIGNS LIST

1: Navigation device, 2: Driving assistance system, 3: Information delivery center, 4: Server device, 5: Vehicle, 16: High-precision map information, 17: Facility information, 18: Connection information, 19: Outside-the-road configuration information, 33: Navigation ECU, 40: Vehicle control ECU, 51: CPU, 74: Recommended parking location, 75: Lane node, 76: Lane link, 81: Walking node, and 82: Walking link

The invention claimed is:

1. A route search device comprising:
a memory storing instructions; and
at least one processor configured to implement:
a parking lot network obtainer for obtaining a parking lot network, the parking lot network being a network representing a route that can be selected in a parking lot by a user with moving means used after getting out of a vehicle the parking lot network;
an in-building network obtainer for obtaining an in-building network, the in-building network being a network representing a route that can be selected within a building to a destination within the building by a user moving after getting out of a vehicle; and
a route searcher for searching for a recommended route from a parking location where a vehicle is parked in a parking lot to a destination present in the building, using a network obtained by connecting the parking lot network to the in-building network,
wherein in the parking lot network, lines which are dividing parking lot spaces are included in a route that can be selected by the user moving after getting out of a vehicle, and
a parking lot network is created using information on lines that mark off the parking spaces in the parking lot, wherein a walking node is set at each end point of the lines that mark off a parking space, and walking links are set between the walking nodes to construct the parking lot network.

2. The route search device according to claim 1, wherein when there are a plurality of candidate parking locations, the route searcher searches for a recommended route from each of the plurality of candidate parking locations to a destination present in the building, the candidate parking locations being parking locations serving as candidates for parking a vehicle in the parking lot, and
the route search device comprises a parking location selector for selecting, based on results of the search for a recommended route, a parking location recommended to park a vehicle from the plurality of candidate parking locations.

3. The route search device according to claim 1, further comprising driver's seat location estimator for estimating a location of a driver's seat in a state in which a vehicle is parked at the parking location,
wherein
the route searcher searches for a recommended route from a location of a driver's seat in a state in which a vehicle is parked at the parking location to a destination present in the building.

4. A non-transitory computer-readable storage medium storing a computer program for causing a computer to function as:
a parking lot network obtainer for obtaining a parking lot network, the parking lot network being a network representing a route that can be selected in a parking lot by a user with moving means used after getting out of a vehicle;
an in-building network obtainer for obtaining an in-building network, the in-building network being a network representing a route that can be selected within a building to a destination within the building by a user moving after getting out of a vehicle; and
a route searcher for searching for a recommended route from a parking location where a vehicle is parked in a parking lot to a destination present in the building, using a network obtained by connecting the parking lot network to the in-building network,
wherein in the parking lot network, lines which are dividing parking lot spaces are included in a route that can be selected by the user moving after getting out of a vehicle, and
a parking lot network is created using information on lines that mark off the parking spaces in the parking lot,
wherein a walking node is set at each end point of the lines that mark off a parking space, and walking links are set between the walking nodes to construct the parking lot network.

* * * * *